(12) United States Patent
Back et al.

(10) Patent No.: US 11,943,184 B2
(45) Date of Patent: Mar. 26, 2024

(54) DEVICE AND METHOD FOR PROVIDING NOTIFICATION MESSAGE RELATED TO CONTENT

(71) Applicant: SAMSUNG ELECTRONICS CO., LTD., Suwon-si (KR)

(72) Inventors: Seohyun Back, Suwon-si (KR); Taeho Kil, Suwon-si (KR); Kyungsu Kim, Suwon-si (KR); Sungjin Kim, Suwon-si (KR); Hojin Jung, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 135 days.

(21) Appl. No.: 17/675,632

(22) Filed: Feb. 18, 2022

(65) Prior Publication Data

US 2022/0231979 A1    Jul. 21, 2022

Related U.S. Application Data

(63) Continuation of application No. PCT/KR2022/001070, filed on Jan. 20, 2022.

(30) Foreign Application Priority Data

Jan. 21, 2021  (KR) .................. 10-2021-0008950
Mar. 25, 2021  (KR) .................. 10-2021-0038979

(51) Int. Cl.
*H04L 51/10*    (2022.01)
*G06V 10/422*   (2022.01)
(Continued)

(52) U.S. Cl.
CPC ............ *H04L 51/10* (2013.01); *G06V 10/422* (2022.01); *G06V 10/74* (2022.01); *H04L 51/224* (2022.05)

(58) Field of Classification Search
CPC ........ H04L 51/10; H04L 51/224; G06V 10/74; G06V 10/422; G06V 10/764;
(Continued)

(56) References Cited

U.S. PATENT DOCUMENTS 10,306,004 B2    5/2019  Lee et al.
10,410,086 B2 *  9/2019  Bapat .................. G06F 18/23
(Continued)

FOREIGN PATENT DOCUMENTS

CN    104966052 A  * 10/2015  ......... G06K 9/00718
CN    110059761 A  *  7/2019  ........... G06F 18/214
(Continued)

OTHER PUBLICATIONS

Xiong et al., "Move Forward and Tell: A Progressive Generator of Video Descriptions", (pp. 1-20) (Year: 2018).*
(Continued)

*Primary Examiner* — Manav Seth
(74) *Attorney, Agent, or Firm* — Sughrue Mion, PLLC

(57) ABSTRACT

Provided are a device and method for providing a notification message related to content. The method includes: recognizing an action related to at least one object in the image content by applying the image content to a first artificial intelligence model for identifying the action of the at least one object; determining target images for identifying the at least one object in the image content; obtaining identification information of the at least one object in the target images by applying the target images to at least one second artificial intelligence model for identifying the at least one object; and generating the notification message describing the image content by applying, to a third artificial intelligence model, an identification value indicating the action and the identification information of the at least one object.

18 Claims, 19 Drawing Sheets

(51) Int. Cl.
*G06V 10/74* (2022.01)
*H04L 51/224* (2022.01)

(58) Field of Classification Search
CPC ...... G06V 10/255; G06V 10/40; G06V 10/70; G06V 20/40; G06V 20/44; G06V 20/49
See application file for complete search history.

(56) References Cited

U.S. PATENT DOCUMENTS

| | | | | |
|---|---|---|---|---|
| 10,455,297 | B1* | 10/2019 | Mahyar | H04N 21/4532 |
| 10,541,001 | B2* | 1/2020 | Cheung | H04L 51/10 |
| 10,546,197 | B2* | 1/2020 | Shrestha | G06N 20/00 |
| 10,607,463 | B2* | 3/2020 | Pan | G06V 20/52 |
| 10,693,822 | B2 | 6/2020 | Lee | |
| 10,783,375 | B2* | 9/2020 | Sridhar | G06N 20/20 |
| 10,885,372 | B2* | 1/2021 | Tsunoda | G06F 18/24 |
| 11,023,761 | B2* | 6/2021 | Xiong | G06V 10/72 |
| 11,120,559 | B2* | 9/2021 | Goncharov | G06T 7/20 |
| 11,238,300 | B2* | 2/2022 | Karianakis | G06V 10/82 |
| 11,385,891 | B1* | 7/2022 | DeLuca | G06F 8/71 |
| 11,443,120 | B2* | 9/2022 | Poddar | H04L 67/306 |
| 11,461,393 | B1* | 10/2022 | Jain | G06F 16/7837 |
| 2015/0058998 | A1* | 2/2015 | Yu | G06F 21/10 |
| | | | | 726/26 |
| 2016/0147387 | A1 | 5/2016 | Rahman et al. | |
| 2018/0150905 | A1 | 5/2018 | Lee et al. | |
| 2019/0005332 | A1* | 1/2019 | Paluri | G06V 20/30 |
| 2019/0138833 | A1* | 5/2019 | Xiong | G06T 7/246 |
| 2019/0258907 | A1 | 8/2019 | Rezende et al. | |
| 2020/0233926 | A1 | 7/2020 | Ghatak et al. | |
| 2022/0207273 | A1* | 6/2022 | Wu | G06T 7/70 |
| 2023/0188679 | A1* | 6/2023 | Lim | G06V 20/41 |
| | | | | 348/143 |
| 2023/0259132 | A1* | 8/2023 | Qian | G06V 20/17 |
| | | | | 701/2 |

FOREIGN PATENT DOCUMENTS

| | | | | |
|---|---|---|---|---|
| EP | 3671699 | A1* | 6/2020 | G06F 3/005 |
| KR | 10-2016-0061250 | A | 5/2016 | |
| KR | 10-2019-0082270 | A | 7/2019 | |
| KR | 10-2035592 | B1 | 10/2019 | |
| KR | 10-2020-0087977 | A | 7/2020 | |
| KR | 10-2020-0094607 | A | 8/2020 | |
| WO | WO-2019194863 | A1* | 10/2019 | H01L 27/14614 |

OTHER PUBLICATIONS

Bojanowski et al., "Finding actors and actions in movies" (pp. 2280-2287) (Year: 2013).*

Yangyu Chen et al., "Less Is More: Picking Informative Frames for Video Captioning", arXiv:1803.01457v1, Mar. 2018, 15 pages total.

Jae Sung Park et al., "Identity-Aware Multi-Sentence Video Description", arXiv:2008.09791v1, Aug. 2020, 26 pages total.

International Search Report and Written Opinion dated May 4, 2022 issued by the International Searching Authority in International Application No. PCT/KR2022/001070 (PCT/ISA/220, PCT/ISA/210, and PCT/ISA/237).

* cited by examiner

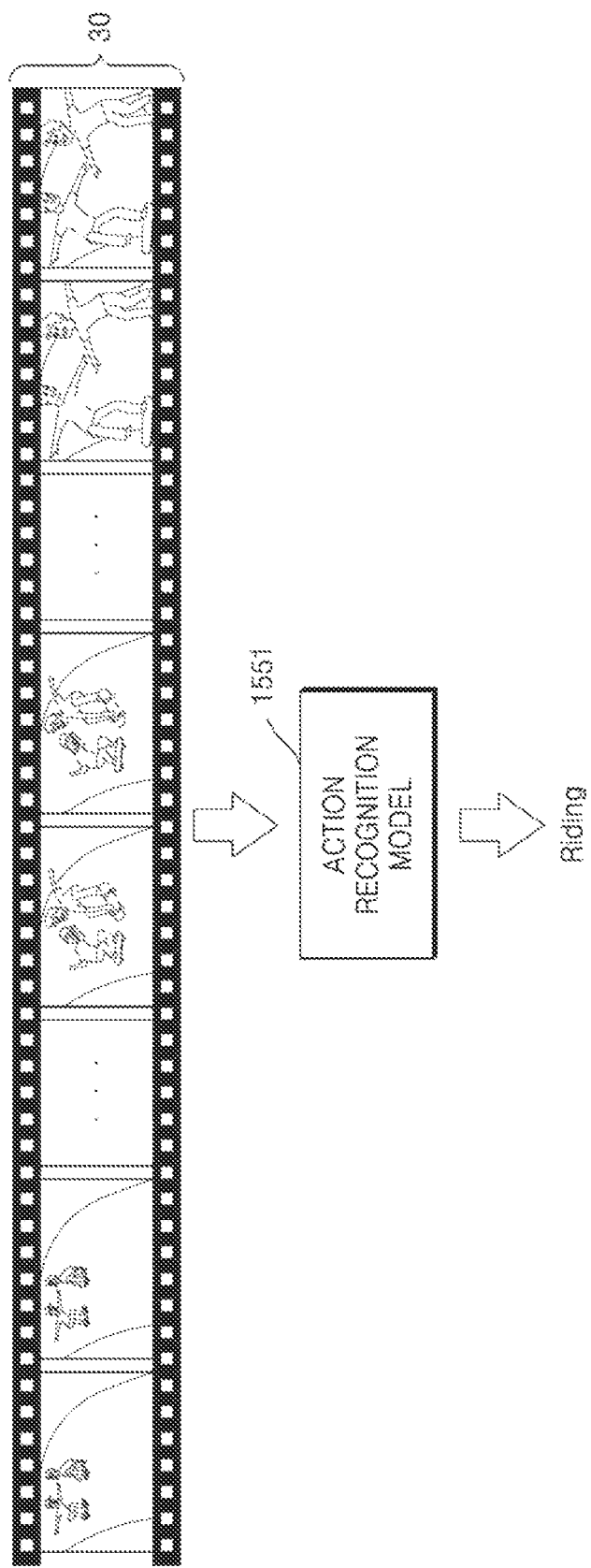

FIG. 7
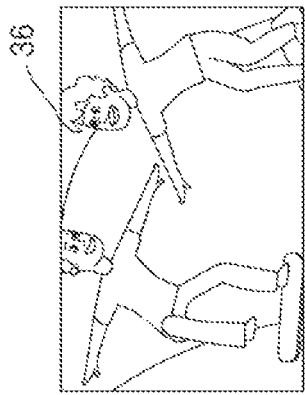
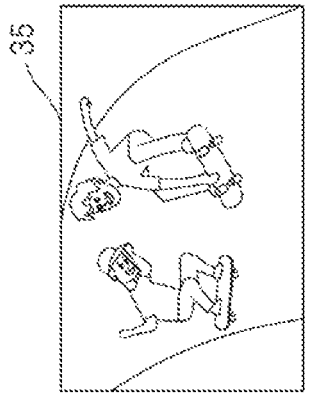
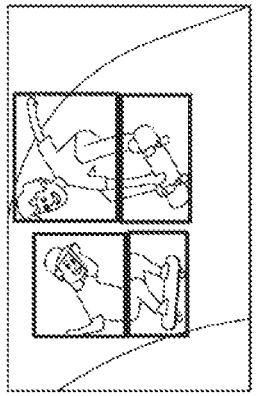
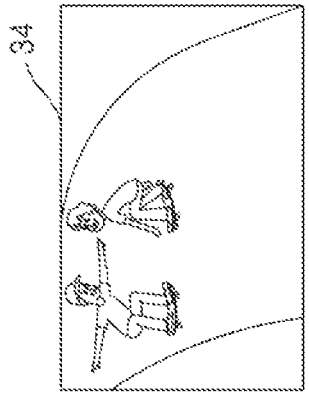
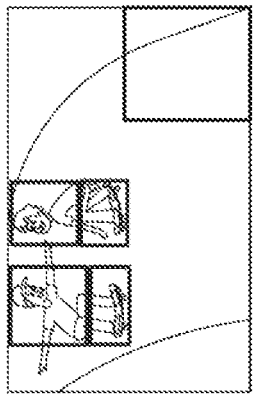

FIG. 9
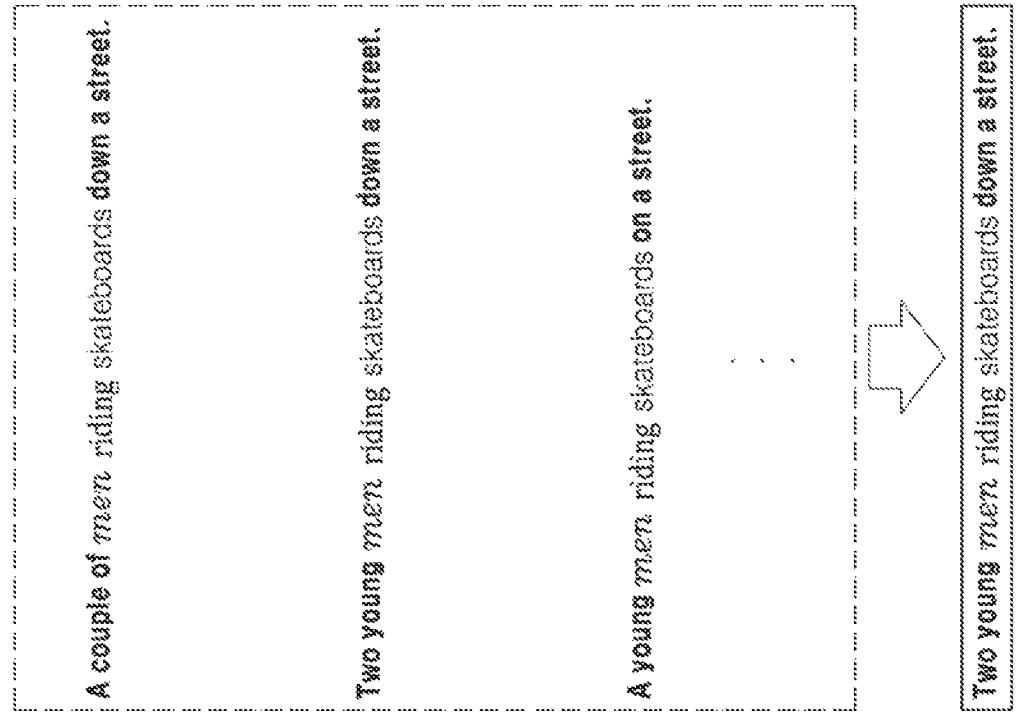
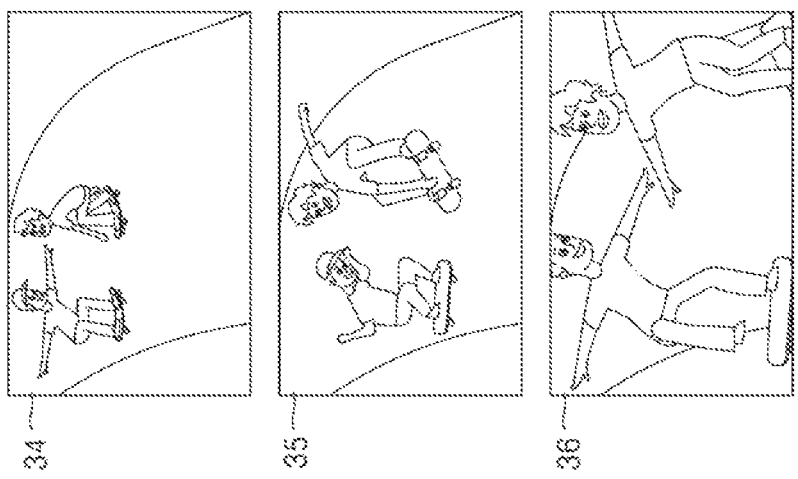

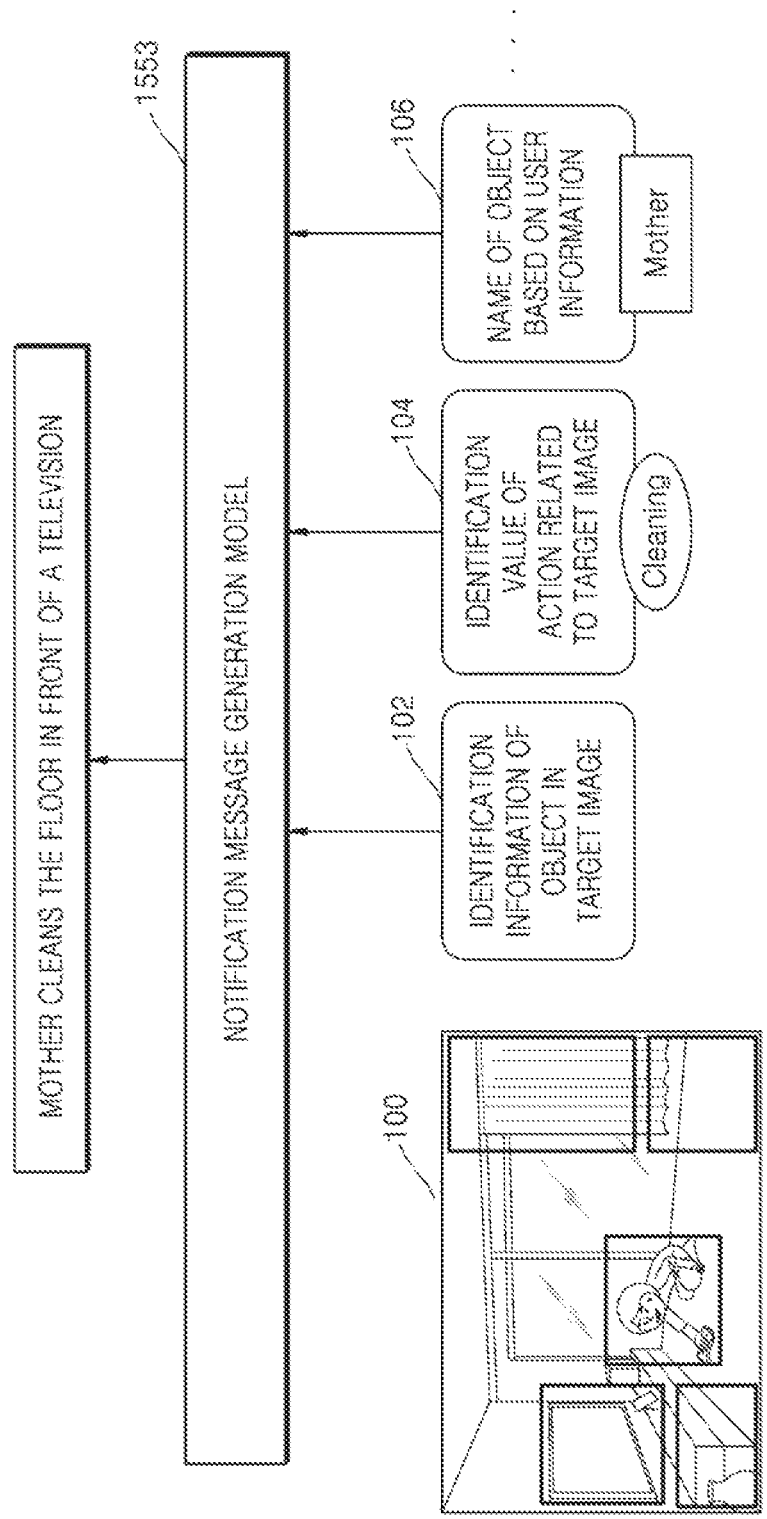

FIG. 13
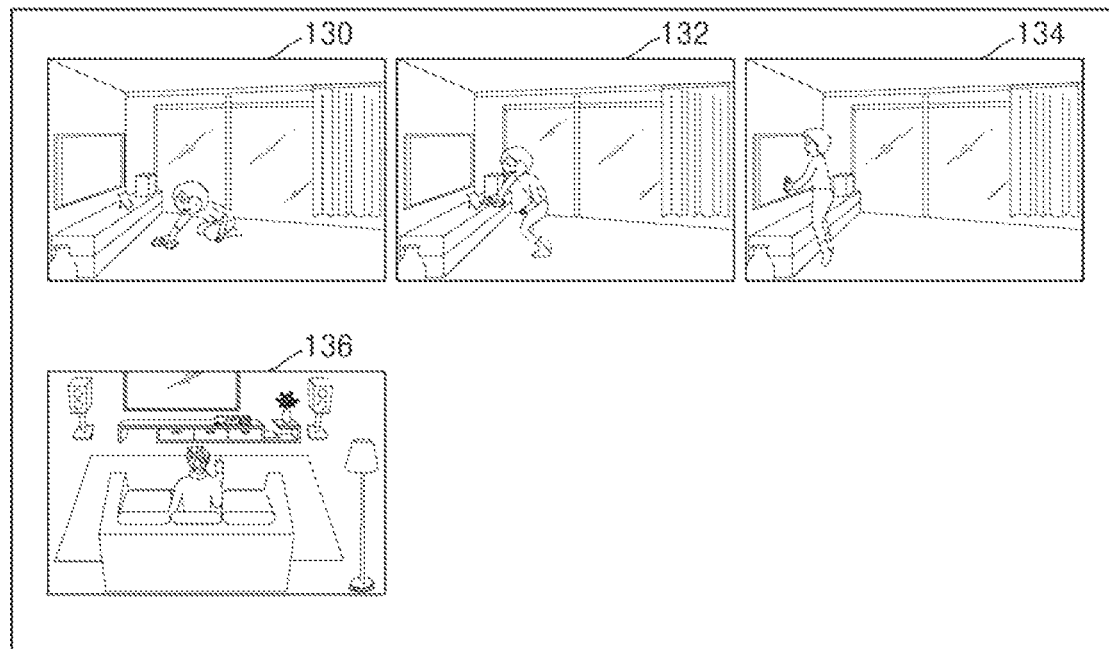
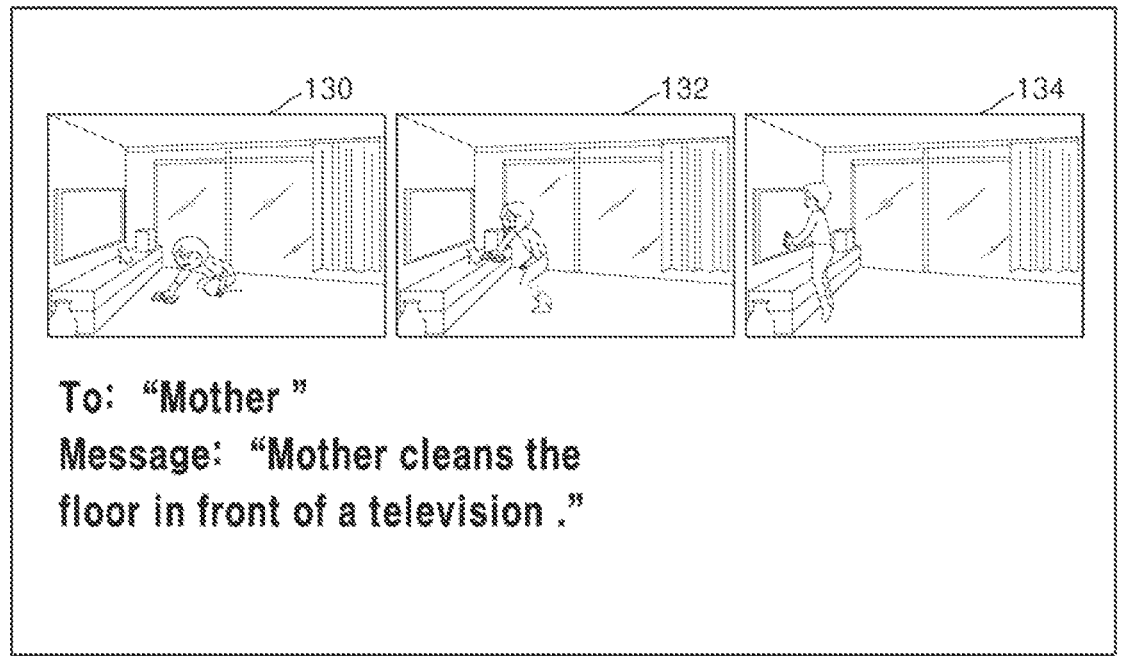

DEVICE AND METHOD FOR PROVIDING NOTIFICATION MESSAGE RELATED TO CONTENT

CROSS-REFERENCE TO RELATED APPLICATION(S)

This application is a bypass continuation application of International Application No. PCT/KR2022/001070, filed on Jan. 20, 2022, which is based on and claims priority under 35 U.S.C. § 119 to Korean Patent Application No. 10-2021-0008950, filed on Jan. 21, 2021, and Korean Patent Application No. 10-2021-0038979, filed on Mar. 25, 2021, in the Korean Intellectual Property Office, the disclosures of which are incorporated by reference herein in their entirety.

BACKGROUND

1. Field

The disclosure relates to a device and method for providing a notification message related to content and, more particularly, to a device and method for generating and providing a notification message related to content including a plurality of images.

2. Description of Related Art

With the development of network technology and data processing technology, users can use various services through devices, and the number of services that allow the users to use the devices to share various types of content with other devices is increasing. Accordingly, when a device receives image content from another device, the device needs to provide the user with a notification message related to the image content, to allow the user to grasp what the received image content is about by briefly checking the notification message.

However, when the device receives image content, it is difficult for the device to efficiently generate and provide a notification message describing the image content, and furthermore, it is difficult for the device to effectively generate a notification message of the image content by using personal information of the user.

Accordingly, there is a need for a technique for efficiently generating a notification message describing image content by utilizing an artificial intelligence model.

SUMMARY

Provided are a device and a method for providing a notification message related to content by using a plurality of artificial intelligence models.

Further, provided are a device and a method for providing a notification message related to content by using an artificial intelligence model to recognize an action of an object in the content including a plurality of images.

Further still, provided are a device and a method for providing a notification message related to content by using an artificial intelligence model to identify an object in a target image selected from the content.

Further still, provided are a device and a method for providing a notification message describing content by using an intelligent model, based on an action related to an object in the content and identification information of the object recognized from a target image.

Further still, provided are a device and a method for providing a notification message related to content by using an artificial intelligence model based on information related to a user of the device.

According to an aspect of the disclosure, there is provided a method, performed by a device, of providing a notification message related to image content, the method including: obtaining the image content including a plurality of images; recognizing an action related to at least one object in the image content by applying the image content to a first artificial intelligence model trained to identify the action related to the at least one object; determining, from the image content, target images for identifying the at least one object in the image content; obtaining identification information of the at least one object in the target images by applying the target images to at least one second artificial intelligence model trained to identify the at least one object; generating the notification message describing the image content by applying, to a third artificial intelligence model trained to generate a notification message, an identification value indicating the action and the identification information of the at least one object; and outputting the notification message, wherein the identification information of the at least one object includes a visual feature with respect to the at least one object.

The identification information of the at least one object may further include an identification value of the at least one object, and the identification value of the at least one object is labeled with the visual feature with respect to the at least one object.

The image content may be video content, and the recognizing the action related to the at least one object may include recognizing the action related to the at least one object included in frame images in the video content by inputting the video content to the first artificial intelligence model.

The recognizing the action related to the at least one object may include: recognizing a first action related to the at least one object from a first frame image included in the video content; recognizing a second action related to the at least one object from a second frame image included in the video content; and obtaining the identification value indicating the action related to the video content based on the first action recognized from the first frame image and the second action recognized from the second frame image.

The determining the target images may include selecting, from among a plurality of frame images in the video content, frame images for identifying the at least one object.

The generating the notification message may include: obtaining a first notification candidate message by inputting, to the third artificial intelligence model, the identification value indicating the action and identification information of the at least one object, which is identified from a first target image; obtaining a second notification candidate message by inputting, to the third artificial intelligence model, the identification value indicating the action and identification information of the at least one object, which is identified from a second target image; and generating the notification message by comparing the first notification candidate message with the second notification candidate message.

The method may further include determining a name of the at least one object in the target images, based on information related to a user stored in the device, and the generating the notification message may include inputting the name to the third artificial intelligence model.

The method may further include transmitting information about the name and the image content to another device, and the name transmitted to the other device may be used by the other device to generate the notification message related to the image content.

The third artificial intelligence model may be trained by using a training image and a word or phrase extracted from a message describing the training image, and the extracted word or phrase may be related to an action of an object in the training image.

The method may further include identifying a domain corresponding to the image content, and at least one of the first artificial intelligence model, the second artificial intelligence model, or the third artificial intelligence model may be selected based on the identified domain.

According to an aspect of the disclosure, there is provided a device for providing a notification message related to image content, the device including: a communication interface; a storage storing instructions; and a processor configured to execute the instructions to: obtain the image content including a plurality of images, recognize an action related to at least one object in the image content by applying the image content to a first artificial intelligence model trained to identify the action related to the at least one object, determine, from the image content, target images for identifying the at least one object in the image content, obtain identification information of the at least one object in the target images by applying the target images to at least one second artificial intelligence model trained to identify the at least one object, generate the notification message describing the image content by applying, to a third artificial intelligence model trained to generate a notification message, an identification value indicating the action and the identification information of the at least one object, and output the notification message, wherein the identification information of the at least one object includes a visual feature with respect to the at least one object.

According to an aspect of the disclosure, a computer-readable recording medium may have recorded thereon a program for executing the method of the first aspect, on a computer.

BRIEF DESCRIPTION OF THE DRAWINGS

FIG. 5 is a diagram illustrating an example in which actions of people in video content are identified, according to an embodiment of the disclosure.

FIG. 7 is a diagram illustrating an example in which identification information of objects is obtained from target images, according to an embodiment of the disclosure.

FIG. 9 is a diagram illustrating an example in which a notification message is generated from a plurality of notification candidate messages, according to an embodiment of the disclosure.

FIG. 10A is a diagram illustrating an example in which a notification message is generated considering user information, according to an embodiment of the disclosure.

FIG. 13 is a diagram illustrating an example in which a device shares image content with another device, according to an embodiment of the disclosure.

DETAILED DESCRIPTION

Figure 1:
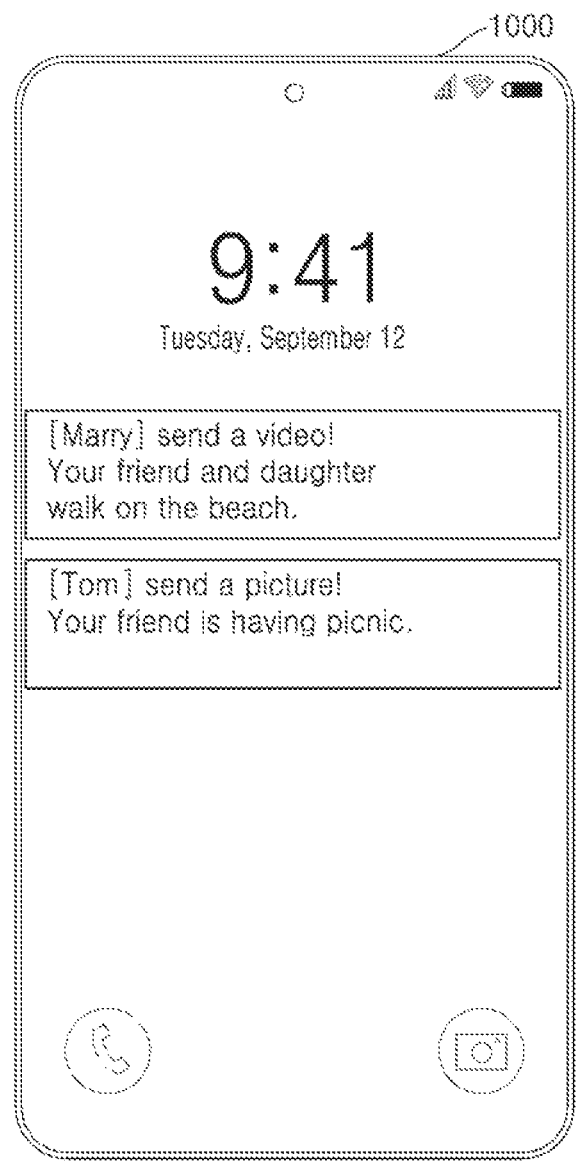
FIG. 1 is a diagram illustrating an example in which a device provides a notification message related to image content, according to an embodiment of the disclosure.

Throughout the disclosure, the expression "at least one of a, b or c" indicates only a, only b, only c, both a and b, both a and c, both b and c, all of a, b, and c, or variations thereof.

Hereinafter, embodiments of the disclosure will be described in detail with reference to the accompanying drawings for one of skill in the art to be able to perform the disclosure without any difficulty. The disclosure may, however, be embodied in many different forms and should not be construed as being limited to the embodiments of the disclosure set forth herein. In order to clearly describe the disclosure, portions that are not relevant to the description of the disclosure are omitted, and similar reference numerals are assigned to similar elements throughout the present specification.

Throughout the present specification, when a part is referred to as being "connected to" another part, it may be "directly connected to" the other part or be "electrically connected to" the other part through an intervening element. In addition, when an element is referred to as "including" a component, the element may additionally include other components rather than excluding other components as long as there is no particular opposing recitation.

Hereinafter, the disclosure will be described in detail with reference to the accompanying drawings.

FIG. 1 is a diagram illustrating an example in which a device 1000 provides a notification message about image content, according to an embodiment of the disclosure.

Referring to FIG. 1, the device 1000 may receive image content from an external source (e.g., another device), generate a notification message describing the received image content, and display the notification message on a screen of the device 1000. The device 1000 may generate the notification message by analyzing the image content, and may use a plurality of artificial intelligence models to analyze the image content. The device 1000 may recognize an action of at least one object in the image content, identify an object in a target image selected from the image content, and generate the notification message for describing the image content based on the recognized action and the identified object. The device 1000 may accurately identify an object in the image content by using information about a user of the device 1000, and generate and provide the notification message by using a name of the object to which the information about the user is reflected.

According to an embodiment of the disclosure, the device 1000 and another device may be, but are not limited to, a smart phone, a tablet personal computer (PC), a PC, a smart television (TV), a mobile phone, a personal digital assistant (PDA), a laptop computer, a media player, a microserver, a global positioning system (GPS) device, an electronic book terminal, a digital broadcasting terminal, a navigation device, a kiosk, an MP3 player, a digital camera, a home appliance, a closed-circuit TV (CCTV), and other mobile or non-mobile computing devices. The device 1000 may be a wearable device, such as a watch, glasses, a hair band, or a ring, which has a communication function and a data processing function. However, the device 1000 is not limited thereto, and may include any type of device capable of transmitting and receiving image content to and from another device and a server.

A network communicatively connected to the device 1000, the other device, and the server may be implemented as a wired network such as a local area network (LAN), a wide area network (WAN), or a value-added network (VAN), or any type of wireless network such as a mobile radio communication network or a satellite communication network. The network may include a combination of at least two of a LAN, a WAN, a VAN, a mobile radio communication network, or a satellite communication network, and is a data communication network having a comprehensive meaning for allowing each network constituent to communicate smoothly with each other, and includes a wired Internet, a wireless Internet, and a mobile wireless communication network. Examples of wireless communication may include, but are not limited to, a wireless LAN (e.g., Wi-Fi), Bluetooth, Bluetooth Low Energy, Zigbee, Wi-Fi Direct (WFD), ultra wideband (UWB), Infrared Data Association (IrDA), and near-field communication (NFC).

Figure 2:
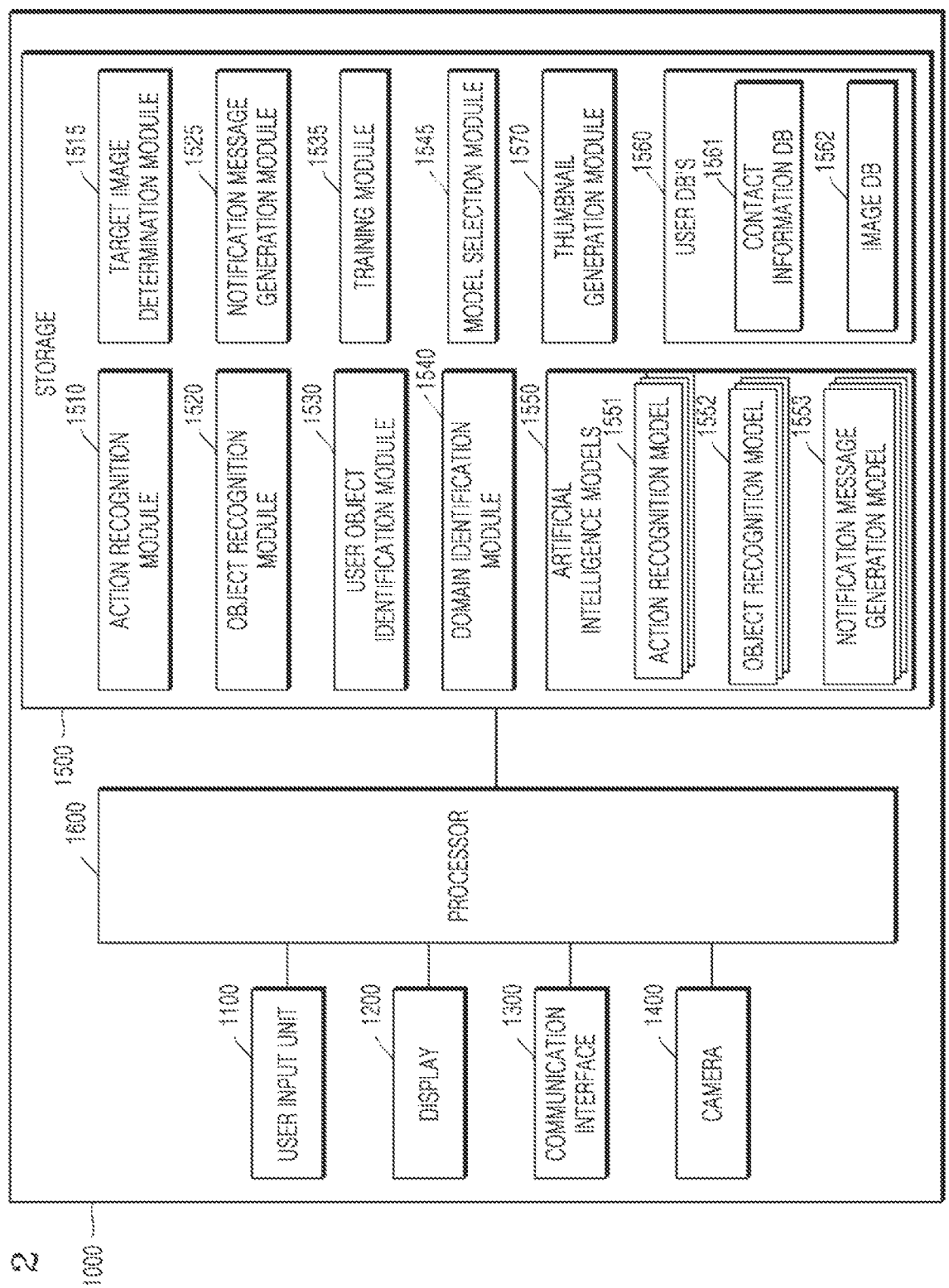
FIG. 2 is a block diagram of a device according to an embodiment of the disclosure.

FIG. 2 is a block diagram of the device 1000 according to an embodiment of the disclosure.

Referring to FIG. 2, the device 1000 may include a user input unit 1100, a display 1200, a communication interface 1300, a camera 1400, a storage 1500, and a processor 1600. The storage 1500 may include an action recognition module 1510, a target image determination module 1515, an object recognition module 1520, a notification message generation module 1525, a user object identification module 1530, a training module 1535, a domain identification module 1540, a model selection module 1545, a thumbnail generation module 1570, artificial intelligence models 1550, and user databases (DBs) 1560.

The user input unit 1100 refers to an interface via which a user inputs data for controlling the device 1000. For example, the user input unit 1100 may include, but is not limited to, at least one of a key pad, a dome switch, a touch pad (e.g., a touch-type capacitive touch pad, a pressure-type resistive overlay touch pad, an infrared sensor-type touch pad, a surface acoustic wave conduction touch pad, an integration-type tension measurement touch pad, a piezoelectric effect-type touch pad), a jog wheel, or a jog switch.

The display 1200 displays information processed by the device 1000. For example, the display 1200 may display a communication application executed by the device 1000, or may display a graphical user interface (GUI) for generating a notification message about image content received from the other device or displaying the image content. The communication application may include, for example, a chat application and a messaging application.

When the display 1200 and a touch pad form a layer structure and thus constitute a touch screen, the display 1200 may also be used as an input device in addition to being used as an output device. The display 1200 may include at least one of a liquid-crystal display, a thin-film-transistor liquid-crystal display, an organic light-emitting diode, a flexible display, a three-dimensional (3D) display, or an electrophoretic display. The device 1000 may include two or more displays 1200 according to an implementation of the device 1000.

The communication interface 1300 may include one or more components for communicating with the other device and the server. For example, the communication interface 1300 may include a short-range wireless communication unit, a mobile communication unit, and a broadcast receiver. The short-range wireless communication unit may include, but is not limited to, a Bluetooth communication unit, a Bluetooth Low Energy (BLE) communication unit, an NFC unit, a Wi-Fi communication unit, a Zigbee communication unit, an IrDA communication unit, a WFD communication unit, a UWB communication unit, an Ant+ communication unit, and the like. The mobile communication unit transmits and receives a wireless signal to and from at least one of a base station, an external terminal, or a server, on a mobile communication network. Here, the wireless signal may include various types of data according to transmission and reception of voice call signals, video call signals, or text/multimedia messages. The broadcast receiver 1 receives a broadcast signal and/or broadcast-related information from the outside via a broadcast channel. The broadcast channels may include satellite channels and terrestrial channels. In addition, the communication interface 1300 may transmit and receive information required to generate a notification message about image content to and from the other device and the server.

The camera 1400 may capture an image of the surroundings of the device 1000. When a program that requires an image capture function is executed, the camera 1400 may obtain an image frame such as a still image or a moving image, by using an image sensor. For example, the camera 1400 may capture an image of the surroundings of the device 1000 while the communication application is executed. An image frame processed by the camera 1400 may be stored in the storage 1500 or transmitted to the outside through the communication interface 1300. Two or more cameras 1400 may be provided according to the configuration of the device 1000.

The storage 1500 may store a program to be executed by the processor 1600, which will be described below, and may store data that is input to the device 1000 or output from the device 1000.

The storage 1500 may include at least one of a flash memory-type storage medium, a hard disk-type storage medium, a multimedia card micro-type storage medium, a card-type memory (e.g., SD or XD memory), random-access memory (RAM), static RAM (SRAM), read-only memory (ROM), electrically erasable programmable ROM (EEPROM), programmable ROM (PROM), magnetic memory, a magnetic disk, or an optical disc.

Programs stored in the storage 1500 may be classified into a plurality of modules according to their functions, and may include, for example, the action recognition module 1510, the target image determination module 1515, the object recognition module 1520, the notification message generation module 1525, the user object identification module 1530, the training module 1535, the domain identification module 1540, the model selection module 1545, the artificial intelligence models 1550, and the user DBs 1560.

The processor 1600 controls the overall operation of the device 1000. For example, the processor 1600 may generally control the user input unit 1100, the display 1200, the communication interface 1300, the camera 1400, and the storage 1500, by executing the programs stored in the storage 1500.

The processor 1600 may receive image content transmitted from the other device by controlling the communication interface 1300. The device 1000 may receive the image content from the other device via a communication application installed in the device 1000. The image content may include still image content and moving image content. For example, the image content may be video content or a set of images. When the image content is video content, a plurality of images in the image content may be a plurality of frame images in the video content. Also, the processor 1600 may call image content stored in the storage 1500 to provide the image content to the other device.

In addition, for example, the device 1000 may receive image content from the other device including a camera. The device 1000 may receive, from another device in a home, such as a CCTV, a TV including a camera, or a cleaning robot including a camera, image content generated by the other device. In this case, when a certain motion of a subject is detected in a preset area in the home, the other device may generate image content in which the subject is photographed. Alternatively, the other device may generate image content in which the subject is photographed at preset intervals.

In addition, the other device may be, for example, a device for a home care service for recognizing managing a situation in a house, and a device for a pet management service for monitoring and managing a condition of a pet, but is not limited thereto.

The processor 1600 may identify an action related to one or more objects in the image content by executing the action recognition module 1510 stored in the storage 1500. The action recognition module 1510 may recognize an action related to one or more objects in the image content, by applying the image content to an action recognition model 1551. The action recognition model 1551 may be an artificial intelligence model trained to recognize an action related to an object in image content. For example, when the image content is video content, the device 1000 may apply all frame images of the video content to the action recognition model 1551, to identify actions of objects that are determined based on the frame images of the video content. Alternatively, for example, the device 1000 may apply frame images related to a particular scene in the video content to the action recognition model 1551, to identify actions of objects that are determined based on frames in the video content.

Alternatively, for example, when the image content is a set of images, the action recognition module 1510 may apply the set of images to the action recognition model 1551, to identify actions of objects that are determined based on the set of images. In this case, at least some of the plurality of images in the set may be selected and input to the action recognition model 1551.

Examples of actions related an object in image content may include "riding", "cleaning", and "birthday party", but are not limited thereto. For example, the action recognition model 1551 may recognize actions related to an object from first to n-th images included in the image content, and output identification values indicating the actions related to the image content, based on the recognized actions. An identification value indicating an action may include at least one word for identifying the action of an object in the image content, and may indicate an action or situation of at least one object in the image content, for example, "riding", "running", "birthday party", or "shouting", but is not limited thereto.

The processor 1600 may determine one or more target images to be used to identify one or more objects in the image content, by executing the target image determination module 1515 stored in the storage 1500. The target image may be an image used to identify an object in the image content. When the image content is video content, the target image determination module 1515 may extract a target image from frame images in the video content. For example, the target image determination module 1515 may extract target images from the frame images in the video content at preset intervals. Alternatively, for example, when a scene in the video content is changed or an object in the video content is changed, the target image determination module 1515 may extract a frame image corresponding to the changed scene or a frame image including the changed object, as a target image. In this case, whether a scene in the video content is changed and whether an object in the video content is changed may be determined based on an output value output from the action recognition model 1551. Alternatively, when the image content is a set of images, the device 1000 may determine at least some of the plurality of images as target images.

The processor 1600 may obtain identification information of one or more objects in the image content by executing the object recognition module 1520 stored in the storage 1500. The identification information of an object is information for identifying the object in the image content, and may include, for example, at least one of a visual feature of the object or an identification value of the object. The visual feature of an object may be a feature of a region where the object is located in the target image. In addition, identification values of an object may include, but are not limited to, text indicating a type of the object, such as "human face", "background", or "pet", and an identification value indicating a name of the object, such as "person", "dog", "cat", or "lawn". Also, an identification value of an object included in a target image may be labeled with a visual feature of the object.

The object recognition module 1520 may obtain identification information of one or more objects in the image content by applying a target image to an object recognition model 1552. The object recognition model 1552 may be an artificial intelligence model trained to identify an object in an image. The object recognition module 1520 may input a plurality of target images to the object recognition model 1552, and obtain, from the object recognition model 1552, identification values of objects included in the plurality of target images and/or visual features of the objects. For example, the object recognition module 1520 may obtain identification values and/or visual features of a person, an object, and a background in the target image.

Also, for example, the object recognition model 1552 may include an object extraction model for obtaining a visual feature of an object in a target image, and an object identification model for obtaining an identification value of an object in a target image. In this case, the object recognition module 1520 may apply the target image to the object extraction model to obtain a visual feature of an object output from the object extraction model. In addition, the object recognition module 1520 may apply the visual feature of the object to the object identification model to obtain an identification value of the object output from the object identification model. Also, the object recognition module 1520 may match the identification value of the object with the visual feature of the object. For example, the object recognition module 1520 may match the identification value of the object with the visual feature of the object by labeling the identification value of the object with the visual feature of the object.

Alternatively, for example, a single object recognition model 1552 may be provided, and in this case, the object recognition module 1520 may apply the target image to the object recognition model 1552 to obtain an identification value and a visual feature of an object output from the object recognition model 1552. Also, the object recognition module 1520 may match the identification value of the object with the visual feature of the object. For example, the object recognition module 1520 may match the identification value of the object with the visual feature of the object by labeling the identification value of the object with the visual feature of the object.

Also, the object recognition model 1552 may output visual features with respect to all of the target images, which may include visual features of objects in the target images.

The processor 1600 may obtain a notification message about the image content by executing the notification message generation module 1525 stored in the storage 1500.

The notification message generation module 1525 may apply, to a notification message generation model 1553, an identification value indicating an action and identification information of one or more objects to obtain the notification message about the image content. The notification message generation model 1553 may be an artificial intelligence model trained to generate a notification message about image content.

For example, the notification message generation module 1525 may input, to the notification message generation model 1553, an identification value indicating an action and visual features of one or more objects. Alternatively, for example, the notification message generation module 1525 may input, to the notification message generation model 1553, an identification value indicating an action, visual features of one or more objects, and identification values of the one or more objects. In this case, the identification values of the one or more objects may be labeled with the visual features of the one or more objects, and the visual features of the one or more objects labeled with the identification values of the one or more objects may be input to the notification message generation model 1553.

In addition, for example, the notification message generation module 1525 may input visual features of all of target images to the notification message generation model 1553, such that visual features of objects in the target images or the visual features of the objects labeled with identification values of the objects are input to the notification message generation model 1553. In this case, the visual features of all of the target images may include the visual features of the objects or the visual features of the objects labeled with the identification values of the objects.

The notification message generation module 1525 may obtain notification candidate messages by using the notification message generation model 1553, and generate a notification message by using the notification candidate messages. The notification message generation module 1525 may obtain a notification candidate message for each of the target images. The notification message generation module 1525 may input, to the notification message generation model 1553, an identification value indicating an action output from the action recognition model 1551 and identification information of an object output from the object recognition model 1552, and obtain a notification candidate message output from the notification message generation model 1553. The notification message generation model 1553 may output a notification candidate message for each target image. Also, the notification message generation module 1525 may generate a notification message to be provided to the user, by using a plurality of notification candidate messages corresponding to a plurality of target images, respectively.

For example, the notification message generation module 1525 may obtain first to n-th notification candidate messages for generating a notification message. The notification message generation module 1525 may input, to the notification message generation model 1553, a first target image, an action identification value output from the action recognition model 1551, and identification information of objects in the first target image output from the object recognition model 1552, and obtain a first notification candidate message output from the notification message generation model 1553.

In addition, the notification message generation module 1525 may input, to the notification message generation model 1553, a second target image, an action identification value output from the action recognition model 1551, and identification information of objects in the second target image output from the object recognition model 1552, and obtain a second notification candidate message output from the notification message generation model 1553.

Also, the notification message generation module 1525 may input, to the notification message generation model 1553, an n-th target image, an action identification value output from the action recognition model 1551, and identification information of objects in the n-th target image output from the object recognition model 1552, and obtain an n-th notification candidate message output from the notification message generation model 1553. In this case, the identification information of the objects in the target images may include identification values of the objects, which may be metadata of the target images, but are not limited thereto.

In addition, the notification message generation module 1525 may generate a notification message by using the first notification candidate message to the n-th notification candidate message. The notification message generation module 1525 may compare the first notification candidate message to the n-th notification candidate message with each other, and generate the notification message based on a comparison result. For example, the notification message generation module 1525 may determine a word or phrase representing an object based on the frequencies of words or phrases representing the object in the first notification candidate message to the n-th notification candidate message, and generate the notification message based on the determined word or phrase. Alternatively, the notification message generation module 1525 may input the first notification candidate message to the n-th notification candidate message to an artificial intelligence model trained to generate a notification message from notification candidate messages, and obtain a notification message output from the artificial intelligence model.

Accordingly, the device 1000 may accurately recognize, by using the image content, an action of an object in the image content, and may effectively identify, by using a target image selected from the image content, an object in the target image. Also, the device 1000 may efficiently generate the notification message about the image content by using the action of the object and the identification information of the object, and may efficiently use a plurality of artificial intelligence models to generate the notification message about the image content.

The processor 1600 may determine a name of an object in a target image by executing the user object identification module 1530 stored in the storage 1500. The user object identification module 1530 may compare objects in the target image with images stored in the user DBs 1560. In the images stored in the user DBs 1560, at least one of the user of the device 1000 or acquaintances of the user may be photographed. For example, the images stored in the user DBs 1560 may include, but are not limited to, images stored in contact information in the device 1000, images captured by the device 1000, and image received by the device 1000 from another device. For example, the user object identification module 1530 may compare objects in a first target image with objects in the images stored in the user DBs 1560, compare objects in a second target image with the objects in the images stored in the user DBs 1560, and compare objects in a third target image with the objects in the images stored in the user DBs 1560. For example, the user object identification module 1530 may search the images stored in the user DBs 1560 for an image including an object corresponding to an object in a target image, by using at least one of identification values or visual features of objects obtained from the object recognition model 1552.

The user object identification module 1530 may determine names of objects in target images. The user object identification module 1530 may identify, from images stored in the device 1000, the same object as an object in a target image, and determine a name corresponding to the identified object. For example, the name of the object may be determined based on an address book, or may be determined based on metadata of an image corresponding to the object.

When the device 1000 receives information about a name of the object in the image content from another device, the user object identification module 1530 may determine the name of the object based on the information received from the other device. The other device may determine the name of the object in the image content based on user information of the other device, and provide the device 1000 with the information about the name of the object while providing the image content to the device 1000. For example, the name of the object in the image content may be included in metadata of the image content, and the other device may transmit the metadata including the name of the object to the device 1000 together with the image content. Accordingly, the device 1000 may use the name of the object received from the other device to generate the notification message describing the image content.

In this case, the notification message generation module 1525 may generate the notification message related to the image content by inputting, to the notification message generation model 1553, an identification value indicating an action in the image content, and identification information and names of one or more objects in the image content. The notification message generation module 1525 may input, to the notification message generation model 1553, a target image, a name of an object, an identification value indicating an action, and identification information of the object, and obtain a notification candidate message output from the notification message generation model 1553. Also, the notification message generation module 1525 may generate a notification message to be provided to the user, by using a plurality of notification candidate messages corresponding to a plurality of target images, respectively.

The thumbnail generation module 1570 may generate a thumbnail image related to the notification message related to the image content. The thumbnail generation module 1570 may generate the thumbnail image related to the notification message by cropping the target image to extracting a partial image based on the notification message. For example, when the notification message is "A man is riding a skateboard", the thumbnail generation module 1570 may generate the thumbnail image by cropping the target image including the man and the skateboard to obtain a partial image including the man and the skateboard. An example of generating a thumbnail image from a target image by using a notification message will be described in more detail with reference to FIG. 12.

When the device 1000 provides image content to another device, the user object identification module 1530 may determine a name of an object in a target image determined from the image content to be provided to the other device, and the device 1000 may provide information about the determined name to the other device together with the image content.

Accordingly, the device 1000 may effectively reflect information related to the user in generating a notification message, and may efficiently use a plurality of artificial intelligence models to generate the notification message related the image content.

The processor 1600 may train the notification message generation model 1553 by executing the training module 1535 stored in the storage 1500. The training module 1535 may obtain training images and messages describing the training images, respectively, to be used for training the notification message generation model 1553. In addition, the training module 1535 may extract at least one word or phrase of a predefined part of speech from the messages describing the training images, and use data including the training images and the extracted word or phrase as training data to train the notification message generation model 1553.

For example, the training module 1535 may extract verbs from the messages describing the training images, and use data including the training images and the extracted verbs, as training data. For example, the training module 1535 may input, to the notification message generation model 1553, the training data including the training images and the extracted verbs, and train the notification message generation model 1553 to output messages including the extracted verbs. Although it is described above that the notification message generation model 1553 is trained based on the extracted verbs, the disclosure is not limited thereto. The notification message generation model 1553 may be trained based on various parts of speech.

Although it is described above that the notification message generation model 1553 is trained by the device 1000, the disclosure is not limited thereto. The server may train the notification message generation model 1553 in the same manner as described above, and the device 1000 may receive, from the server, the notification message generation model 1553 trained by the server. In addition, the device 1000 may receive, from the server, the notification message generation model 1553 refined by the server.

The training module 1535 may retrain the notification message generation model 1553 received from the server to refine it. In this case, the training module 1535 may retrain the notification message generation model 1553 by using data stored in the user DBs 1560 of the device 1000.

The training module 1535 may train the action recognition model 1551 and the object recognition model 1552, or may receive, from the server, the action recognition model 1551 and the object recognition model 1552, which are trained by the server. In addition, the training module 1535 may retrain the action recognition model 1551 and the object recognition model 1552, or may receive, from the server, the action recognition model 1551 and the object recognition model 1552, which are refined by the server.

According to an embodiment of the disclosure, a plurality of action recognition models 1551 may be used by the device 1000, and may correspond to a plurality of domains, respectively. The domain indicates a field to which image content is related, and may be preset according to, for example, the type of another device that transmitted the image content, the type of a service that uses a notification message related to the image content, the type of the image content, the category of the image content, and the like. In addition, the action recognition models 1551 may be trained for respective domains. In this case, the action recognition models 1551 may be models trained by using target images extracted from image content related to the respective domains, and ground truth data corresponding the target images.

Also, according to an embodiment of the disclosure, a plurality of object recognition models 1552 may be used by the device 1000, and may correspond to a plurality of domains, respectively. The domain indicates a field to which image content is related, and may be preset according to, for example, the type of another device that transmitted the image content, the type of a service that uses a notification message related to the image content, the type of the image content, the category of the image content, and the like. In addition, the object recognition models 1551 may be trained for respective domains. In this case, the object recognition models 1552 may be models trained by using target images extracted from image content related to the respective domains, and ground truth data corresponding the target images.

In addition, according to an embodiment of the disclosure, a plurality of notification message generation models 1553 may be used by the device 1000, and may correspond to a plurality of domains, respectively. The domain indicates a field to which image content is related, and may be preset according to, for example, the type of another device that transmitted the image content, the type of a service that uses a notification message related to the image content, the type of the image content, the category of the image content, and the like. In addition, the notification message generation models 1553 may be trained for respective domains. In this case, the notification message generation models 1553 may be models trained by using target images extracted from image content related to the respective domains, and ground truth data corresponding the target images.

The processor 1600 may identify a domain corresponding to image content by executing the domain identification module 1540 stored in the storage 1500. For example, based on an identification value of another device that provided the image content, the domain identification module 1540 of the device 1000 may identify the domain corresponding to the other device as the domain of the image content. In this case, the domain corresponding to the other device may be preset.

In addition, for example, the domain identification module 1540 may identify the domain of the image content by inputting the image content or an image extracted from the image content to a separate artificial intelligence model trained to identify a domain of image content. Also, for example, when the device 1000 receives a text message together with the image content, the domain identification module 1540 may identify the domain of the image content by using the received text message. In addition, for example, the domain identification module 1540 may determine the domain of the image content by using an output value from the action recognition model 1551. In this case, the action recognition model 1551 used to determine the domain may be a general-purpose artificial intelligence model, which is not specialized in a certain domain.

In addition, the processor 1600 may select a model corresponding to the domain of the image content from among a plurality of models by executing the model selection module 1545 stored in the storage 1500. For example, the model selection module 1545 may select the action recognition model 1551 corresponding to the domain of the image content from among the plurality of action recognition models 1551. Accordingly, the action recognition module 1510 may identify an action of the image content by using the selected action recognition model 1551. Also, for example, the model selection module 1545 may select the object recognition model 1552 corresponding to the domain of the image content from among the plurality of object recognition models 1552. The object recognition module 1520 may recognize an object in a target image by using the object recognition model 1552 selected by the model selection module 1545. Also, for example, the model selection module 1545 may select the notification message generation model 1553 corresponding to the domain of the image content from among the plurality of notification message generation models 1553. Accordingly, the notification message generation module 1525 may generate a notification message describing the image content by using the selected notification message generation model 1553.

The user DBs 1560 may include a contact information DB 1561 and an image DB 1562. The contact information DB 1561 may store information about contacts of acquaintances of the user. For example, the contact information DB 1561 may store names and images of the acquaintances of the user. In addition, the image DB 1562 may store images in which at least one of the user or the acquaintances of the user is photographed. For example, the images stored in the image DB 1562 may include images stored in contact information in the device 1000, images captured by the device 1000, and image received by the device 1000 from another device or a server. For example, the image stored in the image DB 1562 may include metadata about a name of an object in the image.

Although it is described above that the device 1000 receives the image content from the other device and generates the notification message, the disclosure is not limited thereto. The other device may provide the image content to a server, and the server may generate a notification message related to the image content and transmit the notification message to the device 1000. In this case, the device 1000 may set a condition for receiving a notification message. For example, the device 1000 may set a condition for receiving, from the server, a notification message related to image content generated by the server when a certain object is included in the image content, when an object in the image content is performing a certain action, and when the image content is related to a certain domain. In this case, the server may include modules and models that perform the same functions as those of the modules and models stored in the storage 1500 of the device 1000 illustrated in FIG. 2.

Alternatively, for example, the role of at least some of the action recognition module 1510, the target image determination module 1515, the object recognition module 1520, the notification message generation module 1525, the user object identification module 1530, the training module 1535, the domain identification module 1540, the model selection module 1545, the thumbnail generation module 1570, and the artificial intelligence models 1550 may be performed by the server. In this case, the device 1000 may transmit and receive, to and from the server, information necessary for the server to perform the function of at least some of the action recognition module 1510, the target image determination module 1515, the object recognition module 1520, the notification message generation module 1525, the user object identification module 1530, the training module 1535, the domain identification module 1540, the model selection module 1545, the thumbnail generation module 1570, and the artificial intelligence models 1550.

Figure 3:
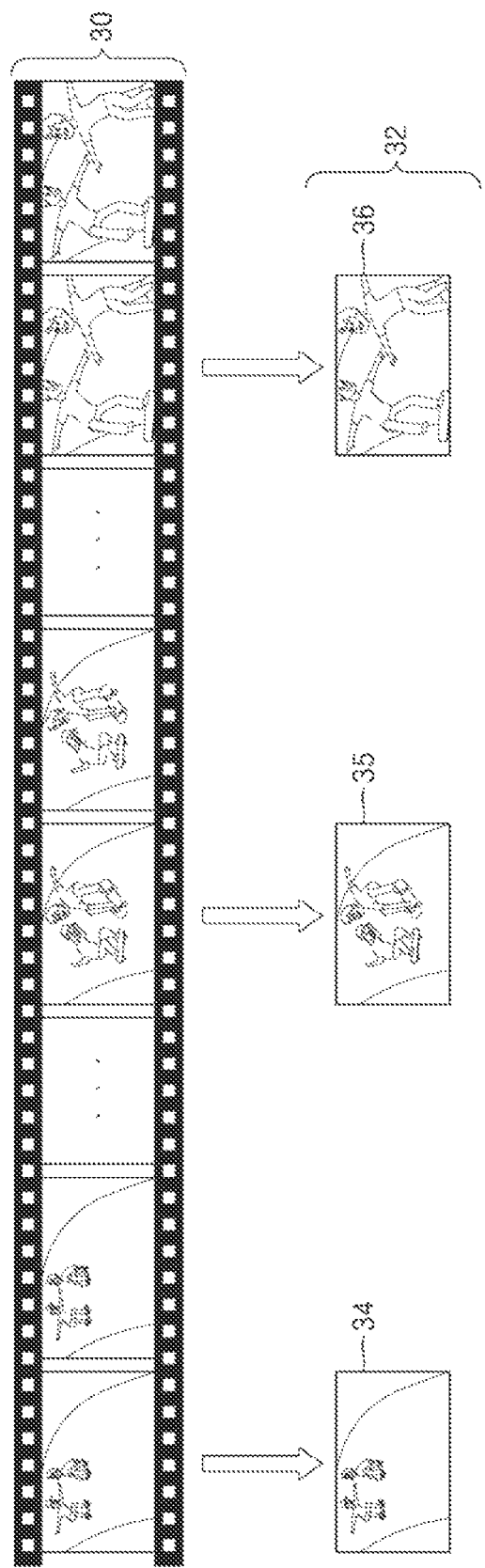
FIG. 3 is a diagram illustrating image content and target images, according to an embodiment of the disclosure.

FIG. 3 is a diagram illustrating image content and target images, according to an embodiment of the disclosure.

Referring to FIG. 3, the image content may be video content 30 including a plurality of frame images, and the video content 30 may include frame images showing two men riding skateboards. In addition, target images 32 may be selected from among the frame images in the video content 30. The target images 32 may be selected according to a predefined criterion. For example, target images 34, 35, and 36 may be extracted from the video content 30 at preset frame intervals. Alternatively, for example, when objects in the video content 30 are changed, the target images 32 including the changed object may be extracted from the video content 30.

Figure 4:
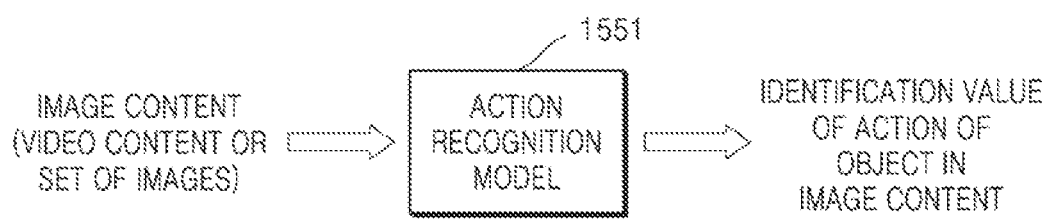
FIG. 4 is a diagram illustrating an example in which an action of an object in image content is identified by an action recognition model, according to an embodiment of the disclosure.

FIG. 4 is a diagram illustrating an example in which an action of an object in image content is identified by the action recognition model 1551, according to an embodiment of the disclosure.

Referring to FIG. 4, the image content may be input to the action recognition model 1551. When the image content is video content, the video content may be input to the action recognition model 1551. For example, all frame images in the video content may be input to the action recognition model 1551. Alternatively, when the image content is a set of images, the set of images may be input to the action recognition model 1551. For example, by inputting, to the action recognition model 1551, a file of the image content or feature data obtained from the image content, the image content may be input to the action recognition model 1551.

In addition, the action recognition model 1551 may output actions of objects in the image content. When the image content is video content, the action recognition model 1551 may output, based on actions of objects recognized from respective frame images in the video content, action identification values indicating the actions of the objects in the video content. When the image content is a set of images, the action recognition model 1551 may output, based on actions of objects recognized from the respective images, action identification values indicating the actions of the objects in the set of images. An action identification value indicating an action of an object may be text data.

FIG. 5 is a diagram illustrating an example in which actions of people in the video content 30 are identified, according to an embodiment of the disclosure.

Referring to FIG. 5, the video content 30 may be input to the action recognition model 1551. The video content 30 may include frame images showing two men riding skateboards. In this case, the action recognition model 1551 may output "riding", which is an action identification value indicating an action of the men in the video content 30.

Figure 6A:
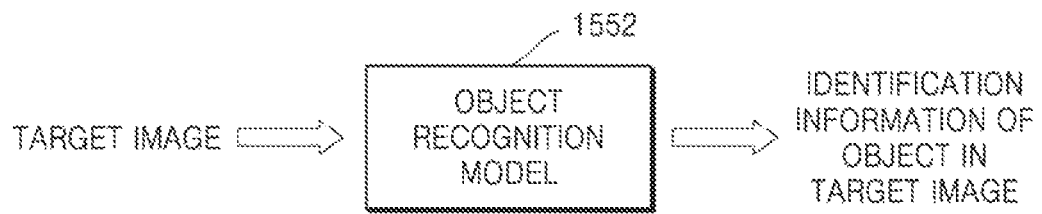
FIG. 6A is a diagram illustrating an example in which an object in a target image is identified by an object recognition model, according to an embodiment of the disclosure.

FIG. 6A is a diagram illustrating an example in which an object in a target image is identified by the object recognition model 1552, according to an embodiment of the disclosure.

Referring to FIG. 6A, the target image may be input to the object recognition model 1552, and identification information of an object may be output from the object recognition model 1552. For example, the identification information of the object may include at least one of an identification value of the object or a visual feature of the object. The object recognition model 1552 may be an artificial intelligence model trained to identify an object in an image. The device 1000 may input a plurality of target images to the object recognition model 1552, and obtain, from the object recognition model 1552, identification information of objects included in the plurality of target images. For example, the object recognition model 1552 may output identification values and/or visual features of a person, an object, and a background in the target image. In addition, for example, by inputting, to the object recognition model 1552, a file of the target image or feature data obtained from the target image, the target image may be input to the object recognition model 1552.

Figure 6B:
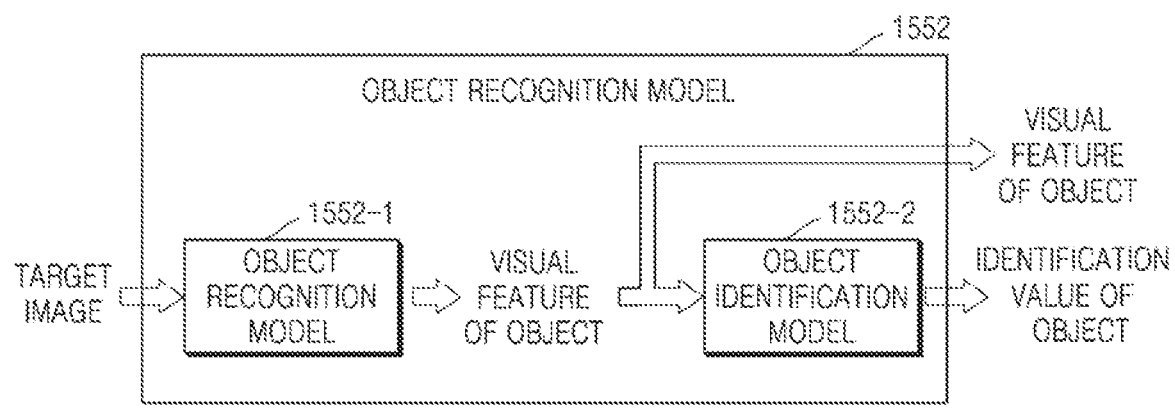
FIG. 6B is a diagram illustrating an example in which an object in a target image is identified by an object recognition model including a plurality of artificial intelligence models, according to an embodiment of the disclosure.

FIG. 6B is a diagram illustrating an example in which an object in a target image is identified by the object recognition model 1552 including a plurality of artificial intelligence models, according to an embodiment of the disclosure.

Referring to FIG. 6B, the target image may be input to an object extraction model 1552-1 in the object recognition model 1552, and a visual feature of an object in the target image may be output from the object extraction model 1552-1. The object extraction model 1552-1 may be an artificial intelligence model trained to extract an object in a target image. In addition, the visual feature of the object output from the object extraction model 1552-1 may be input to an object identification model 1552-2, and an identification value of the object may be output from the object identification model 1552-2. The object identification model 1552-2 may be an artificial intelligence model trained to identify an identification value of an object from a visual feature of the object. Accordingly, the visual feature and the identification value of the object may be output from the object recognition model 1552, and the identification value of the object may be labeled with the visual feature of the object.

FIG. 7 is a diagram illustrating an example in which identification information of objects is obtained from the target images 34, 35, and 36, according to an embodiment of the disclosure.

Referring to FIG. 7, the target images 34, 35, and 36 may be input to the object recognition model 1552. Then, "man", "man", "skateboard", "skateboard", and "street", which are identification values of objects in the target image 34, may be output from the object recognition model 1552, "boy", "boy", "skateboard", "skateboard", and "street", which are identification values of objects in the target image 35, may be output from the object recognition model 1552, and "boy", "skateboard", and "street", which are identification values of objects in the target image 36, may be output from the object recognition model 1552.

In addition, visual features of the objects in the target image 34, visual features of the objects in the target image 35, and visual features of the objects in the target image 36 may be output from object recognition model 152, respectively. In addition, the identification values of the objects may be labeled with the visual features of the objects, respectively.

Figure 8:
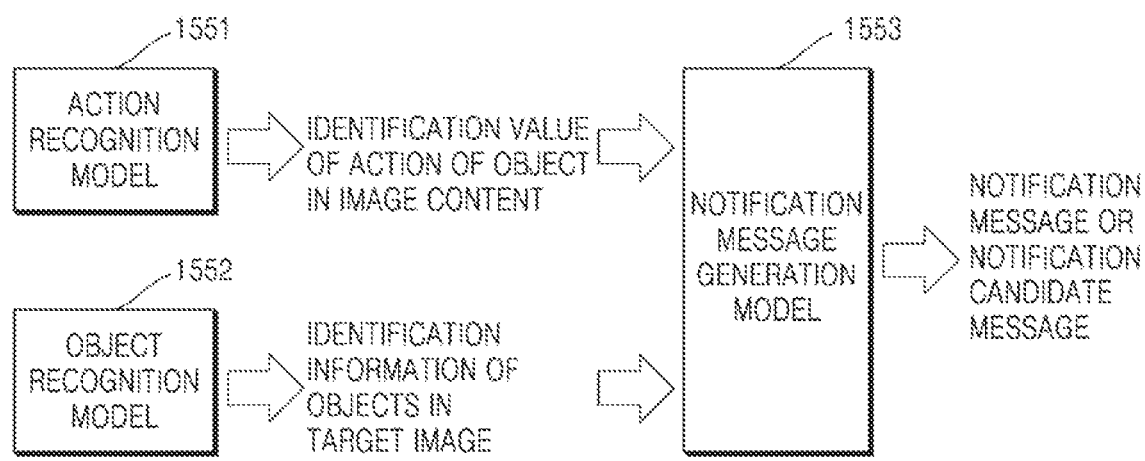
FIG. 8 is a diagram illustrating an example in which a notification message is generated by a notification message generation module, according to an embodiment of the disclosure.

FIG. 8 is a diagram illustrating an example in which a notification message is generated by the notification message generation module 1525, according to an embodiment of the disclosure.

Referring to FIG. 8, an identification value indicating an action of an object output from the action recognition model 1551 and identification information of the object output from the object recognition model 1552 may be input to the notification message generation model 1553. For example, "riding" indicating an action output from the action recognition model 1551 and the visual features of the objects in the target image 34 may be input to the notification message generation model 1553. Alternatively, for example, in addition to "riding" indicating the action output from the action recognition model 1551, and the visual features of the objects in the target image 34, "man", "man", "skateboard", "skateboard", "street", which are identification values of the objects may be additionally input to the notification message generation model 1553.

Also, for example, "riding" indicating the action output from the action recognition model 1551 and the visual features of the objects in the target image 35 may be input to the notification message generation model 1553. Alternatively, for example, in addition to "riding" indicating the action output from the action recognition model 1551, and the visual features of the objects in the target image 35, "boy", "boy", "skateboard", "skateboard", "street", which are identification values of the objects may be additionally input to the notification message generation model 1553.

Also, for example, "riding" indicating the action output from the action recognition model 1551 and the visual features of the objects in the target image 36 may be input to the notification message generation model 1553. Alternatively, for example, in addition to "riding" indicating the action output from the action recognition model 1551, and the visual features of the objects in the target image 36, "boy", "skateboard", and "street", which are identification values of the objects may be additionally input to the notification message generation model 1553.

In addition, a notification candidate message corresponding to the target image 34, a notification candidate message corresponding to the target image 35, and a notification candidate message corresponding to the target image 36 may be output from the notification message generation model 1553.

Although FIG. 8 illustrates that a plurality of target images are input to the notification message generation model 1553, when only one target image is used to generate a notification message, a notification candidate message generated by the notification message generation model 1553 from the target image may be determined as a notification message.

FIG. 9 is a diagram illustrating an example in which a notification message is generated from a plurality of notification candidate messages, according to an embodiment of the disclosure.

Referring to FIG. 9, an action identification value corresponding to the target image 34 may be "riding", and identification values of objects in identification information of the objects in the target image 34 may be "man", "man", "skateboard", "skateboard", and "street". When the action identification value corresponding to the target image 34 and the identification information of the objects in the target image 34 are input to the notification message generation model 1553, "A couple of men riding skateboards down a street.", which is a first notification candidate message, may be obtained.

In addition, an action identification value corresponding to the target image 35 may be "riding", and identification values of objects in identification information of the objects in the target image 35 may be "boy", "boy", "skateboard", "skateboard", and "street". When the action identification value corresponding to the target image 35 and the identification information of the objects in the target image 35 are input to the notification message generation model 1553, "Two young men riding skateboards down a street.", which is a second notification candidate message, may be obtained.

In addition, an action identification value corresponding to the target image 36 may be "riding", and identification values of objects in identification information of the objects in the target image 36 may be "boy", "skateboard", and "street". When the action identification value corresponding to the target image 36 and the identification information of the objects in the target image 36 are input to the notification message generation model 1553, "A young man riding skateboard on a street.", which is a third notification candidate message, may be obtained.

The notification candidate messages generated from the respective target images may be compared with each other, and a notification message may be generated based on a comparison result. For example, words in "A couple of men riding skateboards down a street.", which is the first notification candidate message, words in "Two young men riding skateboards down a street.", which is the second notification candidate message, and words in "A young man riding skateboard on a street.", which is the third notification candidate message, may be compared with each other, and words to be included in the notification message may be determined based on the frequencies of words of the same meanings, respectively. Based on the comparison result, a notification message "Two young men riding skateboards down a street." may be generated.

Alternatively, for example, the notification message generation module 1525 may generate a notification message by using an artificial intelligence model trained to generate a notification message from notification candidate messages. In this case, the first notification candidate message "A couple of men riding skateboards down a street.", the second notification candidate message "Two young men riding skateboards down a street.", and the third notification candidate message "A young man riding skateboard on a street." may be input to the artificial intelligence model, and a notification message "Two young men riding skateboards down a street." may be output from the artificial intelligence model.

FIG. 10A is a diagram illustrating an example in which a notification message is generated considering user information, according to an embodiment of the disclosure.

Referring to FIG. 10A, the device 1000 may activate or deactivate a function of generating a notification message considering user information. When the function of generating a notification message considering user information is activated, the device 1000 may input, to the notification message generation model 153, identification information 102 of objects in a target image 100, an identification value 104 of an action related to the target image 100, and a name 106 of an object in the target image 100, which is generated based on the user information. Accordingly, a message "Mother cleans the floor in front of a television." may be output from the notification message generation model 1553.

In addition, when the function of generating a notification message considering user information is deactivated, the device 1000 may input, to the notification message generation model 153, the identification information 102 of the objects in the target image 100, and the identification value 104 of the action related to the target image 100. In this case, the device 1000 may not input, to the notification message generation model 1553, the name 106 of the object in the target image 100, which is generated based on the user information. Accordingly, a message "A woman cleans the floor in front of a television." may be output from the notification message generation model 1553.

Figure 10B:
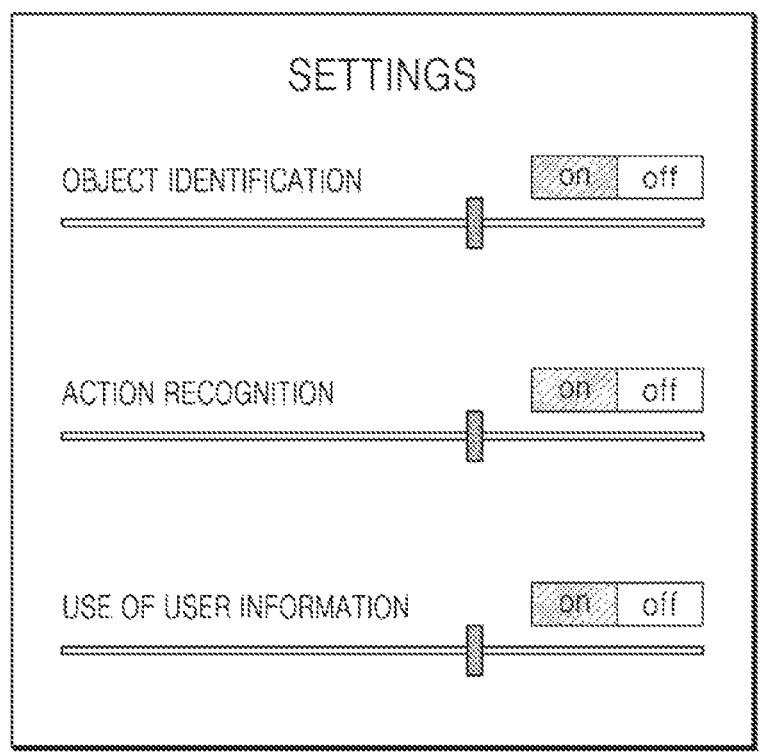
FIG. 10B is a diagram illustrating a graphical user interface (GUI) for setting preferences related to generation of a notification message, according to an embodiment of the disclosure.

FIG. 10B is a diagram illustrating a GUI for setting preferences related to generation of a notification message, according to an embodiment of the disclosure.

Referring to FIG. 10B, a user may use the GUI for setting the preferences related to generation of a notification message to set which information to use to generate a notification message. For example, the GUI for setting the preferences related to generation of a notification message may include objects for setting whether to use identification information of an object, setting whether to recognize an action of an object, and setting whether to use user information for generating a notification message.

For example, the objects for setting whether to use identification information of an object may include a button for selecting whether to use identification information of an object and a slider for adjusting the degree of use of identification information of an object.

In addition, for example, the objects for setting whether to recognize an action of an object may include a button for selecting whether to recognize an action of an object and a slider for adjusting the degree of recognition of an action of an object.

In addition, for example, the objects for setting whether to use user information for generating a notification message may include a button for selecting whether to use user information for generating a notification message and a slider for adjusting the degree of use of user information.

Figure 11:
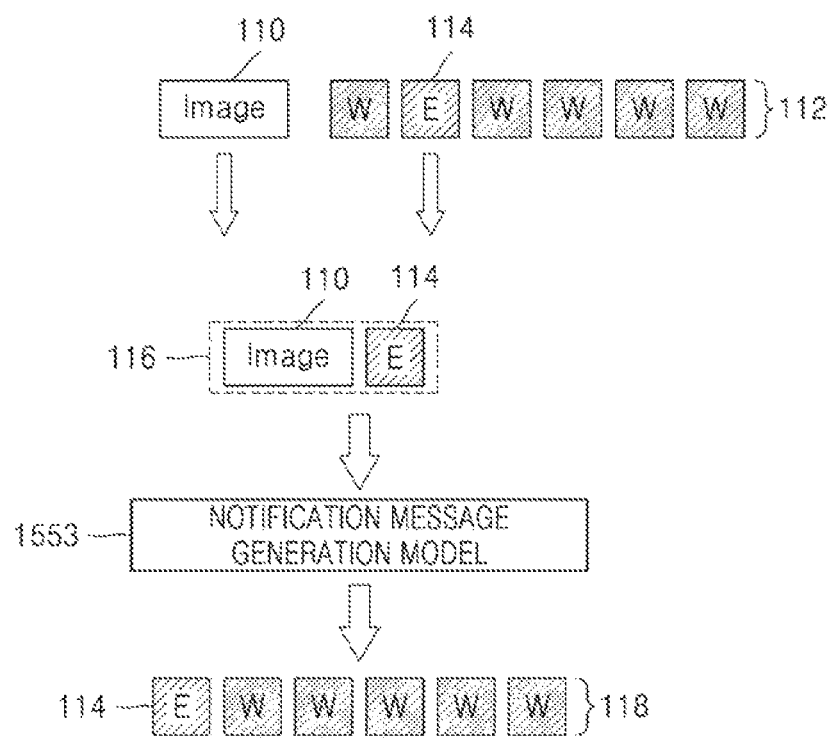
FIG. 11 is a diagram illustrating an example in which a notification message generation model is trained, according to an embodiment of the disclosure.

FIG. 11 is a diagram illustrating an example in which the notification message generation model 1553 is trained, according to an embodiment of the disclosure.

Referring to FIG. 11, the device 1000 may obtain a training image 110 and a message 112 describing the training image 110 to be used for training the notification message generation model 1553. In addition, the device 1000 may extract, from the message 112 describing the training image 110, a word or phrase 114 representing an action of an object in the training image 110. The device 1000 may extract, from the message 112 describing the training image 110, the word or phrase 114 representing the action of the object in the training image 110 by using, for example, a rule-based syntax analyzer. For example, the word or phrase 114 representing the action of the object in the training image 110 may be a verb or a verb phrase, but is not limited thereto. The device 1000 may train the notification message generation model 153 by using the training image 110 and the extracted word or phrase 114, as training data 116. For example, the device 1000 may input, to the notification message generation model 1553, the training data 116 including the training image 110 and the extracted word or phrase 114, and train the notification message generation model 1553 to output a message 118 including the extracted word or phrase 114. For example, the notification message generation model 114 may be trained to output a notification message in which the word or phrase 114 extracted from the message 112 is arranged at a position of a verb or a verb phrase.

Although it is described above that the notification message generation model 153 is trained by using the training data 116 including the training image 110, the disclosure is not limited thereto. For example, instead of the training image 110, identification information of objects in the training image 110 may be included in the training data 116. In this case, the word or phrase 114 extracted from the message 114 and the identification information of the objects in the training image 110 may be input, as the training data 116, to the notification message generation model 114. Then, the notification message generation model 114 may be trained to output a notification message in which the word or phrase 114 extracted from the message 112 is arranged at a position of a verb or a verb phrase.

The identification information of the objects in the training image 110 for use as the training data 116 may be obtained by inputting the training image 110 to the object recognition model 1552. Alternatively, the device 1000 may obtain the identification information of the objects in the training image 110 from the server.

Figure 12:
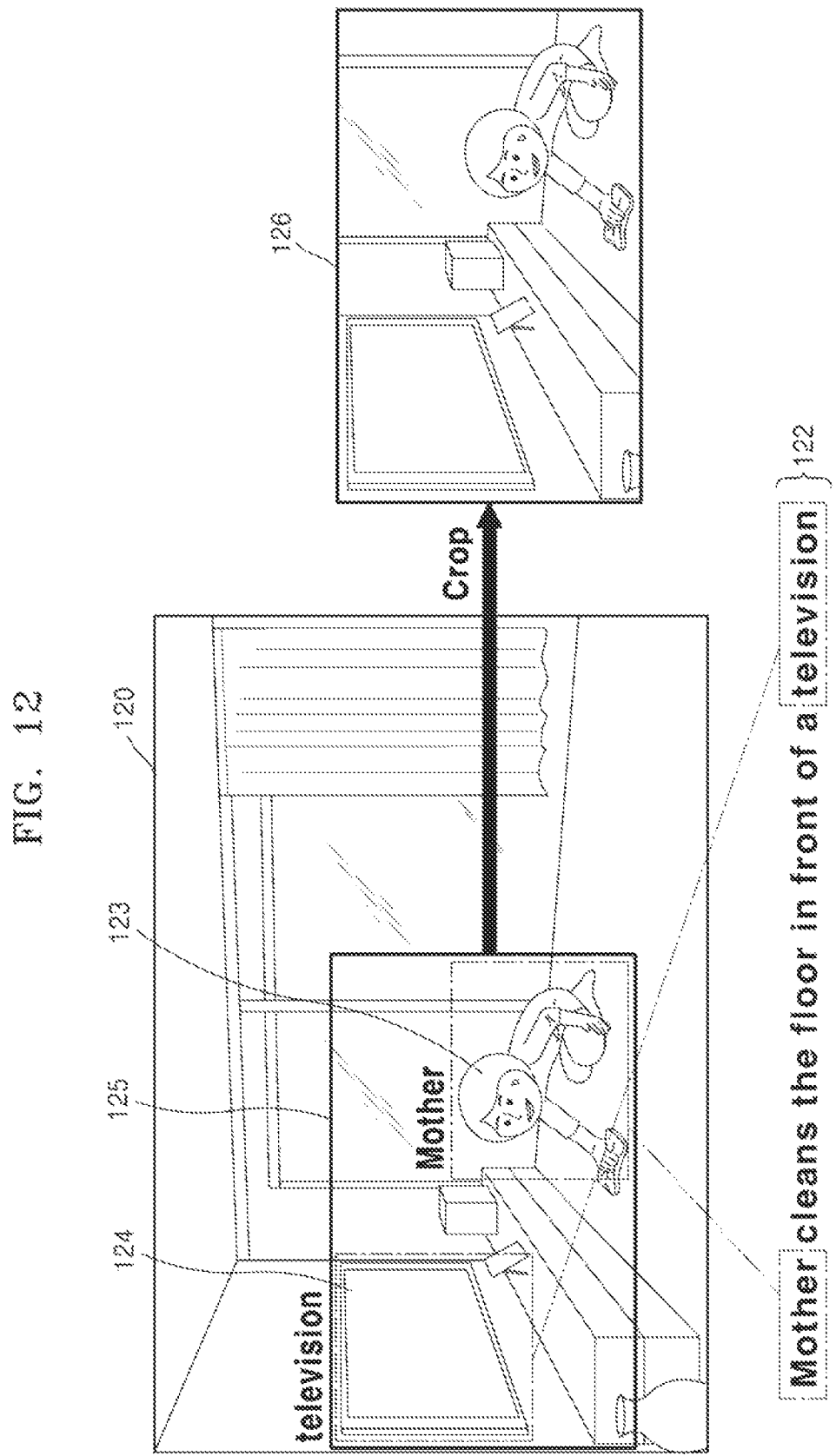
FIG. 12 is a diagram illustrating an example in which a device generates a thumbnail image related to image content, according to an embodiment of the disclosure.

FIG. 12 is a diagram illustrating an example in which the device 1000 generates a thumbnail image related to image content, according to an embodiment of the disclosure.

Referring to FIG. 12, when a notification message is generated from a target image, the device 1000 may crop the target image to obtain a partial image including main objects by using words in the notification message and identification information of objects obtained from the target image.

For example, when a notification message 122 is generated from a target image 120, the device 1000 may identify words "mother" and "television" in the notification message 122, and identify a region 123 corresponding to "mother" and a region 124 corresponding to "television" from the target image 120, based on identification information of objects obtained from the target image 120 by using the object recognition model 1552. For example, the device 1000 may identify "mother" and "television", which are nouns indicating objects in the notification message 122, identify the objects corresponding to "mother" and "television" from the target image 120, and crop the target image 120 to obtain a partial image in which a region including the identified objects is photographed. For example, the region 123 corresponding to "mother" and the region 124 corresponding to "television" may be identified by using the identification information obtained from the target image 120 and user information for determining names of objects, but the disclosure is not limited thereto. In addition, the device 100 may obtain a thumbnail image 126 related to the notification message by cropping the target image 120 to obtain a partial image in which a region 125 including the region 123 corresponding to "mother" and the region 124 corresponding to "television" is photographed.

FIG. 13 is a diagram illustrating an example in which the device 1000 shares image content with another device, according to an embodiment of the disclosure.

Referring to FIG. 13, the device 1000 may provide a notification message for sharing, with another device, a group of images related to the same action or similar actions among a plurality of images stored in the device 1000.

The device 1000 may select, from among the plurality of images stored in the device 1000, images in which a particular person performing a particular action is photographed, and generate a notification message for providing the selected images to the particular person.

The device 1000 may obtain notification candidate messages related to the selected images by inputting, to the notification message generation model 1553, actions related to objects in the respective selected images and identification information of the objects in the respective selected images, and obtain a notification message from the notification candidate messages.

For example, the device 1000 may select, from among images 130, 132, 134, and 136 stored in the device 1000, the images 130, 132, and 134 in which "mother" who is cleaning is photographed, and generate a notification message describing the selected images. For example, the device 1000 may generate a message "Mother cleans the floor in front of a television".

In addition, the device 1000 may provide the user of the device 1000 with a GUI for sharing the selected images with a person photographed in the selected images. For example, the GUI for sharing the selected images may include, but is not limited to, a region where the selected images are displayed, a region where the recipient is displayed, and a region where a message is displayed.

Figure 14:
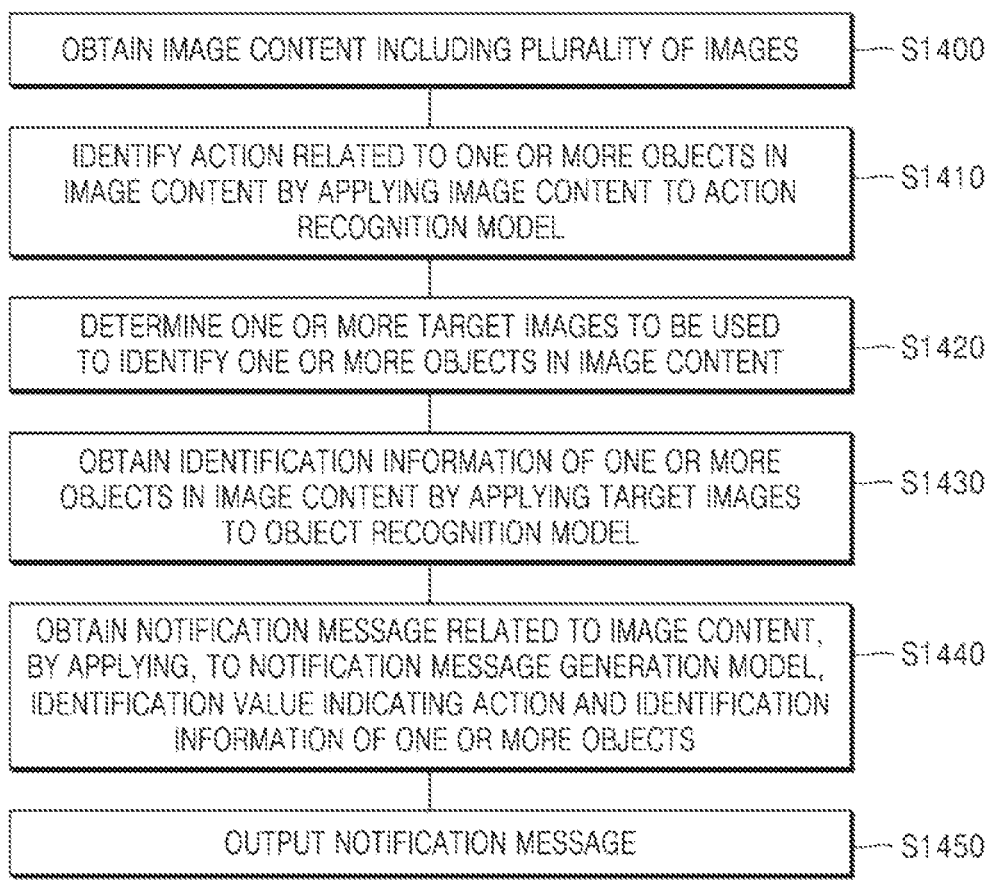
FIG. 14 is a flowchart of a method, performed by a device, of generating a notification message, according to an embodiment of the disclosure.

FIG. 14 is a flowchart of a method, performed by the device 1000, of generating a notification message, according to an embodiment of the disclosure.

In operation S1400, the device 1000 may obtain image content including a plurality of images. The device 1000 may receive the image content transmitted from another device. For example, the image content may be video content or a set of images. When the image content is video content, a plurality of images in the image content may be a plurality of frame images in the video content. The device 1000 may receive the image content from the other device via a communication application installed in the device 1000. The communication application may include, for example, a chat application and a messaging application.

In operation S1410, the device 1000 may identify an action related to one or more objects in the image content by applying the image content to the action recognition model 1551. The action recognition model 1551 may be an artificial intelligence model trained to identify an action related to an object in image content. When the image content is video content, the device 1000 may apply, to the action recognition model 1551, the entire video content or frames related to a particular scene in the video content, to identify actions of objects that are determined based on the frames in the video content. When the image content is a set of images, the device 1000 may apply the set of images to the action recognition model 1551, to identify actions of objects that are determined based on the set of images. Examples of actions related an object in image content may include "riding", "cleaning", and "birthday party", but are not limited thereto.

In operation S1420, the device 1000 may determine one or more target images to be used to identify one or more objects in the image content. When the image content is video content, the device 1000 may extract a target image from frame images in the video content. For example, the device 1000 may extract target images from the frame images in the video content at preset intervals. Alternatively, for example, when a scene in the video content is changed or an object in the video content is changed, the device 1000 may extract a frame image corresponding to the changed scene or a frame image including the changed object, as a target image. In this case, whether a scene in the video content is changed and whether an object in the video content is changed may be determined based on an output value output from the action recognition model 1551. Alternatively, when the image content is a set of images, the device 1000 may determine at least some of the plurality of images as target images.

In operation S1430, the device 1000 may obtain identification information of one or more objects in the image content by applying the target images to the object recognition model 1552. The object recognition model 1552 may be an artificial intelligence model trained to identify an object in an image. The device 1000 may input a plurality of target images to the object recognition model 1552, and obtain, from the object recognition model 1552, identification information of objects included in the plurality of target images. For example, the device 1000 may obtain identification information of a person, an object, and a background in the target image. The device 1000 may obtain at least one of identification values or visual features of one or more objects in the image content by applying the target image to the object recognition model 1552. The visual feature of an object may be a feature of a region where the object is located in the target image. Also, an identification value of an object included in a target image may be labeled with a visual feature of the object.

In operation S1440, the device 1000 may obtain a notification message related to the image content, by applying, to the notification message generation model 1553, an identification value indicating an action and identification information of one or more objects. The notification message generation model 1553 may be an artificial intelligence model trained to generate a notification message related to image content.

For example, the device 1000 may input, to the notification message generation model 1553, an identification value indicating an action output from the action recognition model 1551, identification information of an object output from the object recognition model 1552, and the target image, and obtain a notification candidate message output from the notification message generation model 1553.

The notification message generation model 1553 may output a notification candidate message for each target image. In addition, the device 1000 may generate a notification message to be provided to the user, by using a plurality of notification candidate messages corresponding to a plurality of target images, respectively.

In operation S1450, the device 1000 may output the notification message. When the image content is received through the communication application, a notification message describing the received image content may be displayed on the screen of the device 1000. For example, when the device 1000 is locked, the notification message describing the image content may be displayed on a lock screen of the device 1000. In addition, for example, when an execution screen of the communication application having received the image content is not activated on the screen of the device 1000, the notification message describing the image content may be displayed through a tray window or a pop-up window.

Figure 15:
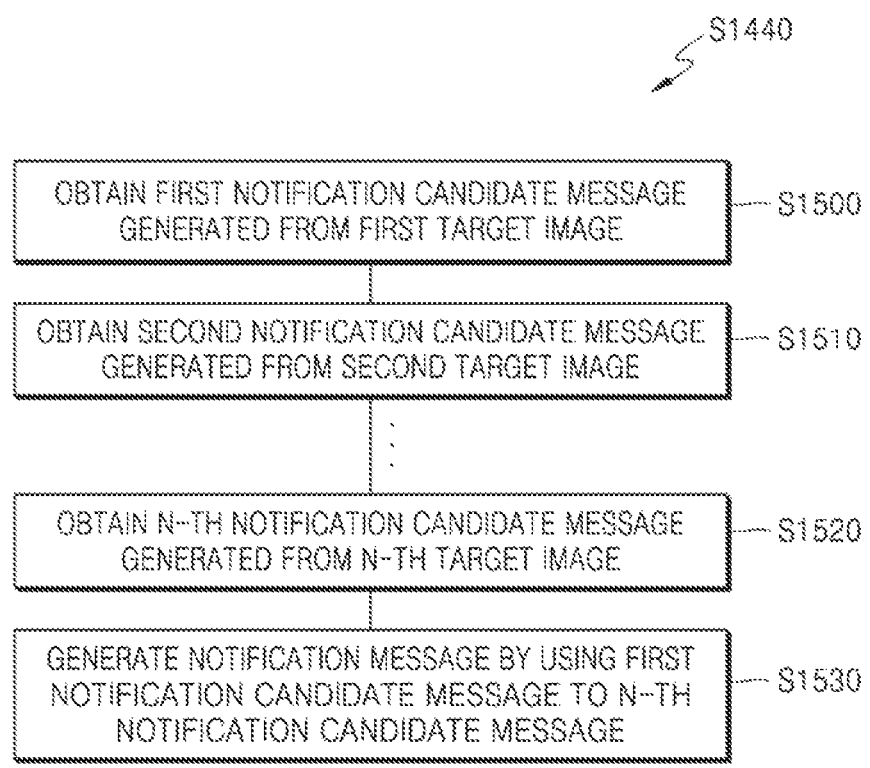
FIG. 15 is a flowchart of a method, performed by a device, of generating a notification message, according to an embodiment of the disclosure.

FIG. 15 is a flowchart of a method, performed by the device 1000, of generating a notification message, according to an embodiment of the disclosure.

In operation S1500, the device 1000 may obtain a first notification candidate message generated from a first target image. The device 1000 may input, to the notification message generation model 1553, an identification value of an action output from the action recognition model 1551 and identification information of objects in the first target image output from the object recognition model 1552, and obtain a first notification candidate message output from the notification message generation model 1553.

In operation S1510, the device 1000 may obtain a second notification candidate message generated from a second target image. The device 1000 may input, to the notification message generation model 1553, an identification value of an action output from the action recognition model 1551 and identification information of objects in the second target image output from the object recognition model 1552, and obtain a second notification candidate message output from the notification message generation model 1553.

In operation S1520, the device 1000 may obtain an n-th notification candidate message generated from an n-th target image. The device 1000 may input, to the notification message generation model 1553, an identification value of an action output from the action recognition model 1551 and identification information of objects in the n-th target image output from the object recognition model 1552, and obtain an n-th notification candidate message output from the notification message generation model 1553.

In operation S1530, the device 1000 may generate a notification message by using the first notification candidate message to the n-th notification candidate message. The device 1000 may compare the first notification candidate message to the n-th notification candidate message with each other, and generate the notification message based on a comparison result. For example, the device 1000 may determine a word or phrase representing an object based on the frequencies of words or phrases representing the object in the first notification candidate message to the n-th notification candidate message. Then, the device 1000 may generate the notification message based on the determined word or phrase.

Alternatively, the device 1000 may input the first notification candidate message to the n-th notification candidate message to an artificial intelligence model trained to generate a notification message, and obtain a notification message output from the artificial intelligence model.

Figure 16:
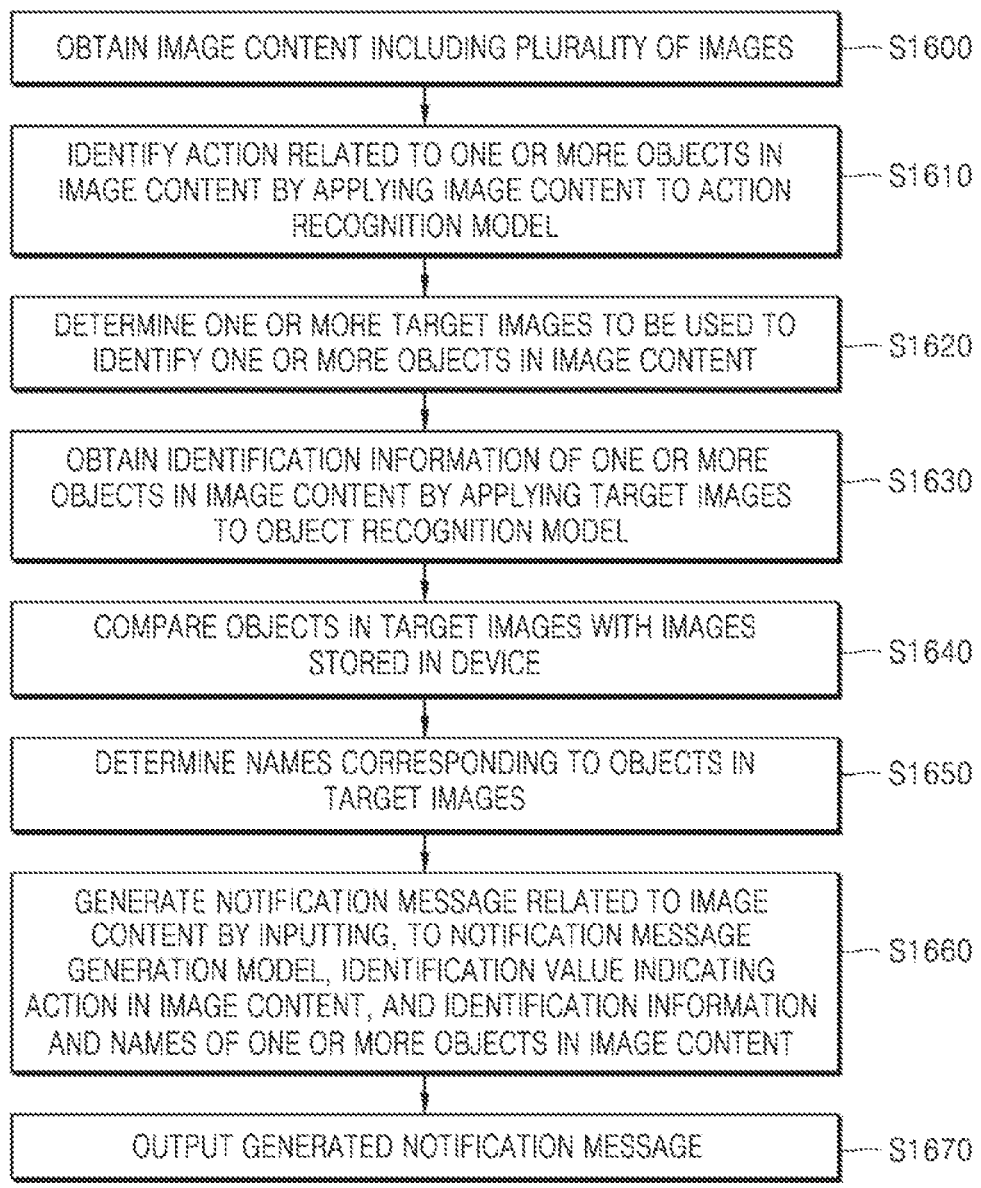
FIG. 16 is a flowchart of a method, performed by a device, of generating a notification message considering user information, according to an embodiment of the disclosure.

FIG. 16 is a flowchart of a method, performed by the device 1000, of generating a notification message considering user information, according to an embodiment of the disclosure.

Operations S1600 to S1630 correspond to operations S1400 to S1430, respectively, and thus a description of operations S1600 to S1630 will be omitted for convenience of description.

In operation S1640, the device 1000 may compare objects in the target images with images stored in the device 1000. In the images stored in the device 1000, at least one of the user of the device 1000 or acquaintances of the user may be photographed. For example, the images stored in the device 1000 may include, but are not limited to, images stored in contact information in the device 1000, images captured by the device 1000, and image received by the device 1000 from another device. For example, the device 1000 may compare objects in a first target image with objects in the images stored in the device 1000, compare objects in a second target image with the objects in the images stored in the device 1000, and compare objects in a third target image with the objects in the images stored in the device 1000.

In operation S1650, the device 1000 may determine names of the objects in the target images. The device 1000 may identify, from the images stored in the device 1000, the same object as an object in a target image, and identify a name corresponding to the identified object. For example, the name of the object may be determined based on an address book, or may be determined based on metadata of an image corresponding to the object.

When the device 1000 receives information about a name of the object in the image content from another device, the device 1000 may determine the name of the object based on the information received from the other device. The other device may determine the name of the object in the image content based on user information of the other device, and provide the device 1000 with the information about the name of the object while providing the image content to the device 1000. For example, the name of the object in the image content may be included in metadata of the image content, and the other device may transmit the metadata including the name of the object to the device 1000 together with the image content. Accordingly, the device 1000 may use the name of the object received from the other device to generate the notification message describing the image content.

In operation S1660, the device 1000 may generate a notification message related to the image content by inputting, to the notification message generation model 1553, an identification value indicating an action in the image content, and identification information and names of one or more objects in the image content.

The device 1000 may input, to the notification message generation model 1553, an identification value indicating an action output from the action recognition model 1551, identification information of an object output from the object recognition model 1552, and the names of the objects, and obtain a notification candidate message output from the notification message generation model 1553. The notification message generation model 1553 may output a notification candidate message for each target image. In addition, the device 1000 may generate a notification message to be provided to the user, by using a plurality of notification candidate messages corresponding to a plurality of target images, respectively.

In operation S1670, the device 1000 may output the notification message. When the image content is received through the communication application, a notification message describing the received image content may be displayed on the screen of the device 1000.

Figure 17:
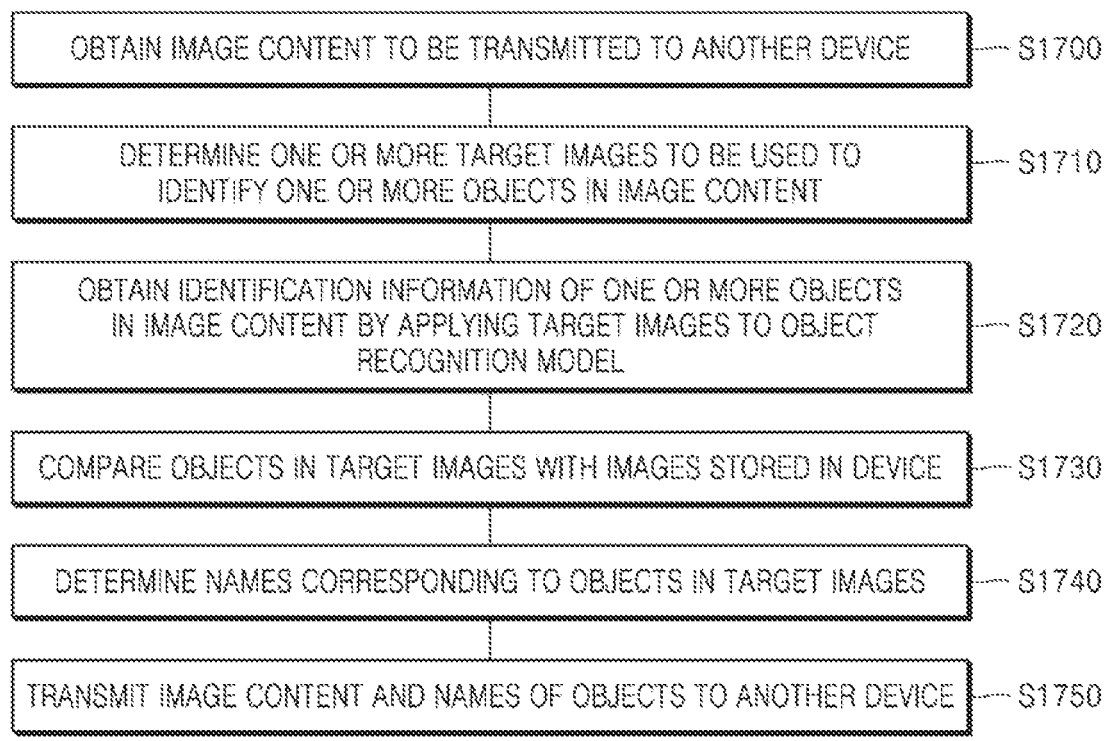
FIG. 17 is a flowchart of a method, performed by a device, of providing another device with a name of an object in image content that is to be also transmitted to the other device, according to an embodiment of the disclosure.

FIG. 17 is a flowchart of a method, performed by the device 1000, of providing another device with a name of an object in image content that is to be also transmitted to the other device, according to an embodiment of the disclosure.

In operation S1700, the device 1000 may obtain the image content to be transmitted to the other device. The device 1000 may obtain the image content including a plurality of images. For example, the image content may be video content or a set of images. The device 1000 may generate image content or extract image content stored in the device 1000 in order to provide the image content to the other device via the communication application installed in the device 1000.

In operation S1710, the device 1000 may determine one or more target images to be used to identify one or more objects in the image content. When the image content is video content, the device 1000 may extract a target image from frame images in the video content. For example, the device 1000 may extract target images from the frame images in the video content at preset intervals. Alternatively, for example, when a scene in the video content is changed or an object in the video content is changed, the device 1000 may extract a frame image corresponding to the changed scene or a frame image including the changed object, as a target image. Alternatively, when the image content is a set of images, the device 1000 may determine at least some of the plurality of images as target images.

In operation S1720, the device 1000 may obtain identification information of one or more objects in the image content by applying the target images to the object recognition model 1552. The object recognition model 1552 may be an artificial intelligence model trained to identify an object in an image. The device 1000 may input a plurality of target images to the object recognition model 1552, and obtain, from the object recognition model 1552, identification information of objects included in the plurality of target images. For example, the device 1000 may obtain identification information of a person, an object, and a background in the target image.

In operation S1730, the device 1000 may compare objects in the target images with the images stored in the device 1000. In the images stored in the device 1000, at least one of the user of the device 1000 or acquaintances of the user may be photographed. For example, the images stored in the device 1000 may include, but are not limited to, images stored in contact information in the device 1000, images captured by the device 1000, and image received by the device 1000 from another device. For example, the device 1000 may compare objects in a first target image with objects in the images stored in the device 1000, compare objects in a second target image with the objects in the images stored in the device 1000, and compare objects in a third target image with the objects in the images stored in the device 1000.

In operation S1740, the device 1000 may determine names of the objects in the target images. The device 1000 may identify, from the images stored in the device 1000, the same object as an object in a target image, and identify a name corresponding to the identified object. For example, the name of the identified object may be determined based on an address book, or may be determined based on metadata of an image corresponding to the identified object.

In operation S1750, the device 1000 may transmit the image content and the names of the objects to the other device. The names of the objects may be included in metadata of the image content, and the device 1000 may transmit, to the other device, the metadata including the names of the objects together with the image content. The names of the objects transmitted to the other device may be used by the other device to generate a notification message describing the image content.

Functions related to artificial intelligence according to the disclosure are operated by a processor and a memory. The processor may include one or more processors. In this case, the one or more processors may be a general-purpose processor such as a central processing unit (CPU), an application processor (AP), or a digital signal processor (DSP), a dedicated graphics processor such as a graphics processing unit (GPU) or a vision processing unit (VPU), or a dedicated artificial intelligence processor such as a neural processing unit (NPU). The one or more processors may perform control to process input data according to predefined operation rules or an artificial intelligence model stored in the memory. Alternatively, in a case where the one or more processors are dedicated artificial intelligence processors, the dedicated artificial intelligence processor may be designed with a hardware structure specialized for processing a particular artificial intelligence model.

The predefined operation rules or artificial intelligence model is generated via a training process. Here, being generated via a training process may mean that the predefined operation rules or artificial intelligence model set to perform desired characteristics (or purposes), is generated by training a basic artificial intelligence model by using a learning algorithm that utilizes a large amount of training data. The training process may be performed by a device itself on which artificial intelligence according to the disclosure is performed, or by a separate server and/or system. Examples of the learning algorithm may include, but are not limited to, supervised learning, unsupervised learning, semi-supervised learning, or reinforcement learning.

The artificial intelligence model may include a plurality of neural network layers. Each of the plurality of neural network layers has a plurality of weight values, and performs a neural network operation through an operation between an operation result of a previous layer and the plurality of weight values. The plurality of weight values in each of the plurality of neural network layers may be optimized by a result of training the artificial intelligence model. For example, the plurality of weight values may be refined to reduce or minimize a loss or cost obtained by the artificial intelligence model during the training process. An artificial neural network may include a deep neural network (DNN), and may be, for example, a convolutional neural network (CNN), a DNN, a recurrent neural network (RNN), a restricted Boltzmann machine (RBM), a deep belief network (DBN), a bidirectional recurrent DNN (BRDNN), or a deep Q-network, but is not limited thereto.

In the method, performed by the device 1000, of generating a notification message according to the disclosure, for recognizing an action of an object from image content and identifying the object in a target image, the image content may be used as input data of the action recognition model 1551 and the target image may be used as input data of the object recognition model 1552. In addition, the action recognition model 1551 may recognize an action of an object in the image content and output data, and the object recognition model 1552 may identify the object in the target image and output data. The artificial intelligence model may be generated via a training process. Here, being generated via a training process may mean that the predefined operation rules or artificial intelligence model set to perform desired characteristics (or purposes), is generated by training a basic artificial intelligence model by using a learning algorithm that utilizes a large amount of training data. The artificial intelligence model may include a plurality of neural network layers. Each of the plurality of neural network layers has a plurality of weight values, and performs a neural network operation through an operation between an operation result of a previous layer and the plurality of weight values.

Visual understanding is a technology for recognizing and processing objects as in human vision and includes object recognition, object tracking, image retrieval, human recognition, scene recognition, three-dimensional (3D) reconstruction/localization, image enhancement, etc.

An embodiment of the disclosure may be implemented as a recording medium including computer-executable instructions such as a computer-executable program module. A computer-readable medium may be any available medium which is accessible by a computer, and may include a volatile or non-volatile medium and a removable or non-removable medium. Also, the computer-readable media may include computer storage media and communication media. The computer storage media include both volatile and non-volatile, removable and non-removable media implemented in any method or technique for storing information such as computer readable instructions, data structures, program modules or other data. The communication medium may typically include computer-readable instructions, data structures, or other data of a modulated data signal such as program modules.

A computer-readable storage medium may be provided in the form of a non-transitory storage medium. Here, the term 'non-transitory storage medium' refers to a tangible device and does not include a signal (e.g., an electromagnetic wave), and the term 'non-transitory storage medium' does not distinguish between a case where data is stored in a storage medium semi-permanently and a case where data is stored temporarily. For example, the non-transitory storage medium may include a buffer in which data is temporarily stored.

According to an embodiment, the method according to various embodiments disclosed herein may be included in a computer program product and provided. The computer program product may be traded between a seller and a purchaser as a commodity. The computer program product may be distributed in the form of a machine-readable storage medium (e.g., compact disk read only memory (CD-ROM)), or may be distributed online (e.g., downloaded or uploaded) through an application store (e.g., Play Store™) or directly between two user devices (e.g., smart phones). In the case of online distribution, at least a portion of the computer program product (e.g., a downloadable app) may be temporarily stored in a machine-readable storage medium such as a manufacturer's server, an application store's server, or a memory of a relay server.

In addition, in the present specification, the term "unit" may be a hardware component such as a processor or a circuit, and/or a software component executed by a hardware component such as a processor.

The above-described description of the disclosure is provided only for illustrative purposes, and those of skill in the art will understand that the disclosure may be easily modified into other detailed configurations without modifying technical aspects and essential features of the disclosure. Therefore, it should be understood that the above-described embodiments are exemplary in all respects and are not limited. For example, the elements described as single entities may be distributed in implementation, and similarly, the elements described as distributed may be combined in implementation.

The scope of the disclosure is not defined by the detailed description of the disclosure but by the following claims, and all modifications or alternatives derived from the scope and spirit of the claims and equivalents thereof fall within the scope of the disclosure.

The invention claimed is:

1. A method, performed by a device, of providing a notification message related to image content, the method comprising:
   obtaining the image content including a plurality of images;
   recognizing an action related to at least one object in the image content by applying the image content to a first artificial intelligence model trained to identify the action related to the at least one object;
   determining, from the image content, target images for identifying the at least one object in the image content;
   obtaining identification information of the at least one object comprising a visual feature with respect to the at least one object in the target images by applying the target images to at least one second artificial intelligence model trained to identify the at least one object;
   generating the notification message describing the image content by applying, to a third artificial intelligence model trained to generate a notification message, an identification value indicating the action and the identification information of the at least one object, wherein the third artificial intelligence model is trained by using a training image and a word or phrase extracted from a message describing the training image, and the extracted word or phrase is related to an action of an object in the training image; and
   outputting the notification message.

2. The method of claim 1, wherein the identification information of the at least one object further comprises an identification value of the at least one object, and
   the identification value of the at least one object is labeled with the visual feature with respect to the at least one object.

3. The method of claim 1, wherein the image content is video content, and
   the recognizing the action related to the at least one object comprises recognizing the action related to the at least one object included in frame images in the video content by inputting the video content to the first artificial intelligence model.

4. The method of claim 3, wherein the recognizing the action related to the at least one object comprises:
   recognizing a first action related to the at least one object from a first frame image included in the video content;
   recognizing a second action related to the at least one object from a second frame image included in the video content; and
   obtaining the identification value indicating the action related to the video content based on the first action recognized from the first frame image and the second action recognized from the second frame image.

5. The method of claim 3, wherein the determining the target images comprises selecting, from among a plurality of frame images in the video content, frame images for identifying the at least one object.

6. The method of claim 1, wherein the generating the notification message comprises:
   obtaining a first notification candidate message by inputting, to the third artificial intelligence model, the identification value indicating the action and identification information of the at least one object, which is identified from a first target image;
   obtaining a second notification candidate message by inputting, to the third artificial intelligence model, the identification value indicating the action and identification information of the at least one object, which is identified from a second target image; and
   generating the notification message by comparing the first notification candidate message with the second notification candidate message.

7. The method of claim 1, further comprising determining a name of the at least one object in the target images, based on information related to a user stored in the device,
wherein the generating the notification message comprises inputting the name to the third artificial intelligence model.

8. The method of claim 7, further comprising transmitting information about the name and the image content to another device,
wherein the name transmitted to the other device is used by the other device to generate the notification message related to the image content.

9. The method of claim 1, further comprising identifying a domain corresponding to the image content,
wherein at least one of the first artificial intelligence model, the second artificial intelligence model, or the third artificial intelligence model is selected based on the identified domain.

10. A device for providing a notification message related to image content, the device comprising:
a communication interface;
a storage storing instructions; and
a processor configured to execute the instructions to:
obtain the image content including a plurality of images,
recognize an action related to at least one object in the image content by applying the image content to a first artificial intelligence model trained to identify the action related to the at least one object,
determine, from the image content, target images for identifying the at least one object in the image content,
obtain identification information of the at least one object comprising a visual feature with respect to the at least one object in the target images by applying the target images to at least one second artificial intelligence model trained to identify the at least one object,
generate the notification message describing the image content by applying, to a third artificial intelligence model trained to generate a notification message, an identification value indicating the action and the identification information of the at least one object, wherein the third artificial intelligence model is trained by using a training image and a word or phrase extracted from a message describing the training image, and the extracted word or phrase is related to an action of an object in the training image, and
output the notification message.

11. The device of claim 10, wherein the identification information of the at least one object further comprises an identification value of the at least one object, and
the identification value of the at least one object is labeled with the visual feature with respect to the at least one object.

12. The device of claim 10, wherein the image content is video content, and
the processor is further configured to execute the instructions to recognize the action related to the at least one object included in frame images in the video content by inputting the video content to the first artificial intelligence model.

13. The device of claim 12, wherein the processor is further configured to execute the instructions to:
recognize a first action related to the at least one object from a first frame image included in the video content,
recognize a second action related to the at least one object from a second frame image included in the video content, and
obtain the identification value indicating the action related to the video content based on the first action recognized from the first frame image and the second action recognized from the second frame image.

14. The device of claim 12, wherein the processor is further configured to execute the instructions to select, from among a plurality of frame images in the video content, frame images for identifying the at least one object.

15. The device of claim 10, wherein the processor is further configured to execute the instructions to:
obtain a first notification candidate message by inputting, to the third artificial intelligence model, the identification value indicating the action and identification information of the at least one object, which is identified from a first target image,
obtain a second notification candidate message by inputting, to the third artificial intelligence model, the identification value indicating the action and identification information of the at least one object, which is identified from a second target image, and
generate the notification message by comparing the first notification candidate message with the second notification candidate message.

16. The device of claim 10, wherein the processor is further configured to execute the instructions to:
determine a name of the at least one object in the target images based on information related to a user stored in the device, and
input the name to the third artificial intelligence model.

17. The device of claim 16, wherein the processor is further configured to execute the instructions to transmit information about the name and the image content to another device, and
the name transmitted to the other device is used by the other device to generate the notification message related to the image content.

18. A non-transitory computer-readable recording medium having recorded thereon a program which is executable by a processor to perform a method comprising:
obtaining image content including a plurality of images;
recognizing an action related to at least one object in the image content by applying the image content to a first artificial intelligence model trained to identify the action related to the at least one object;
determining, from the image content, target images for identifying the at least one object in the image content;
obtaining identification information of the at least one object comprising a visual feature with respect to the at least one object in the target images by applying the target images to at least one second artificial intelligence model trained to identify the at least one object;
generating a notification message describing the image content by applying to a third artificial intelligence model trained to generate a notification message, an identification value indicating the action and the identification information of the at least one object, wherein the third artificial intelligence model is trained by using a training image and a word or phrase extracted from a message describing the training image, and the extracted word or phrase is related to an action of an object in the training image; and
outputting the notification message.

* * * * *